(12) United States Patent
Dhillon et al.

(10) Patent No.: US 9,137,590 B2
(45) Date of Patent: Sep. 15, 2015

(54) OSPFTE EXTENSION TO SUPPORT GMPLS FOR FLEXIBLE GRID

(71) Applicant: Infinera Corp., Annapolis Junction, MD (US)

(72) Inventors: Abinder Dhillon, Allen, TX (US); Iftekhar Hussain, Santa Clara, CA (US); Rajan Rao, Cupertino, CA (US); Marco Sosa, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 61 days.

(21) Appl. No.: 13/676,946

(22) Filed: Nov. 14, 2012

(65) Prior Publication Data

US 2013/0308945 A1   Nov. 21, 2013

Related U.S. Application Data

(60) Provisional application No. 61/559,199, filed on Nov. 14, 2011.

(51) Int. Cl.
*H04Q 11/00* (2006.01)
*H04J 14/02* (2006.01)
*H04L 12/751* (2013.01)
*H04L 12/723* (2013.01)
*H04L 12/721* (2013.01)

(52) U.S. Cl.
CPC ........ *H04Q 11/0003* (2013.01); *H04J 14/0267* (2013.01); *H04L 45/02* (2013.01); *H04L 45/50* (2013.01); *H04Q 11/0062* (2013.01); *H04L 45/62* (2013.01); *H04Q 2011/0073* (2013.01); *H04Q 2011/0075* (2013.01); *H04Q 2011/0077* (2013.01); *H04Q 2011/0086* (2013.01); *H04Q 2011/0088* (2013.01)

(58) Field of Classification Search
CPC ... H04J 14/02; H04J 14/0227; H04Q 11/0003
USPC ...................................................... 398/48–50
See application file for complete search history.

(56) References Cited

U.S. PATENT DOCUMENTS

2003/0189933 A1* 10/2003 Ozugur et al. ............. 370/395.1
2008/0170856 A1*  7/2008 Shi et al. ...................... 398/50

OTHER PUBLICATIONS

Hussain et al., "Generalized Label Super-Channel Assignment on Flexible Grid", draft-hussain-ccamp-super-channel-label-02.txt, IETF, Oct. 11, 2011.*
Session RST-2603, "Deploying MPLS Traffic Engineering", Cisco Systems, 2004.*

* cited by examiner

*Primary Examiner* — Shi K Li
(74) *Attorney, Agent, or Firm* — Dunlap Codding LLP; David L. Soltz

(57) ABSTRACT

A method and system are disclosed in which a link state advertisement message (LSA) conforming to a Generalized Multiprotocol Label Switching (GMPLS) routing protocol is generated and transmitted. The LSA is associated with a TE Link between a transmit node and a receive node in a network. The transmit node supplies a plurality of optical signals, each of which has a plurality of frequencies, the frequencies being allocated among a plurality of spectral portions such that the plurality of spectral portions are grouped into a plurality of frequency slots. The LSA may include information indicative of a number of spectral portions, e.g., spectral slices, which correspond to frequencies of selected ones of the plurality of optical signals, said selected ones of the plurality of optical signals being available to carry data from the transmit node to the receive node.

12 Claims, 17 Drawing Sheets

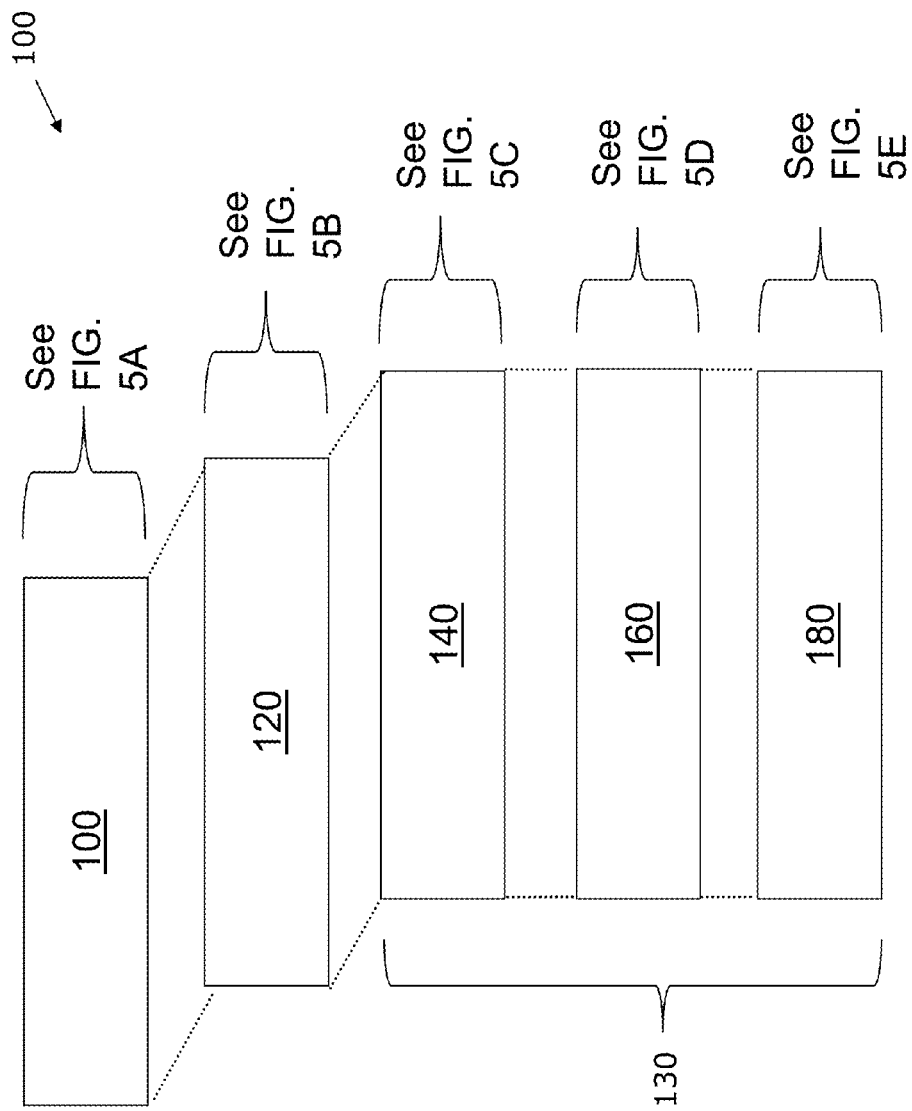

OSPFTE EXTENSION TO SUPPORT GMPLS FOR FLEXIBLE GRID

FIELD OF THE DISCLOSURE

The disclosure generally relates to methods and apparatuses that facilitate the generation and transmission of a link state advertisement message including information indicative of a number of spectral portions, which correspond to frequencies of selected ones of a plurality of optical signals, said selected ones of the plurality of optical signals being available to carry data from a transmit node to a receive node. The link state advertising message may be transmitted from the transmit node to the receive node such that a label switched path in accordance with the number of the plurality of spectral portions can be established. The information indicative of a number of spectral portions in the link state advertising message may include slice spacing information, and an identification of unreserved spectral portions, e.g., slices, to permit establishment of the label switched path using the unreserved spectral slices. The label switched paths can be working connections, high-priority protecting connections, and low-priority protecting connections. The bandwidth information can be saved in a link state database and used for computing routes or paths in the optical transport network for setting up label switched paths in networks having multiple nodes communicating via communication links. By way of example, the methodologies set forth herein are described in the context of GMPLS based traffic engineering (TE) routing for Dense Wave-Division Multiplexing in Optical Transport Networks.

BACKGROUND

An Optical Transport Network (OTN) is comprised of a plurality of switch nodes linked together to form a network. The OTN includes an electronic layer and an optical layer. The electronic layer and the optical layer each contain multiple sub-layers. The optical layer provides optical connections, also referred to as optical channels or lightpaths, to other layers, such as the electronic layer. The optical layer performs multiple functions, such as monitoring network performance, multiplexing wavelengths, and switching and routing wavelengths. In general, the OTN is a combination of the benefits of SONET/SDH technology and dense wavelength-division multiplexing (DWDM) technology (optics). OTN structure, architecture, and modeling are further described in the International Telecommunication Union recommendations, including ITU-T G.709, ITU-T G.872, and ITU-T G.805, which are well known in the art.

The construction and operation of switch nodes (also referred to as "nodes") in the OTN is well known in the art. In general, the nodes of an OTN are generally provided with a control module, input interface(s) and output interface(s). The control modules of the nodes in the OTN function together to aid in the control and management of the OTN. The control modules can run a variety of protocols for conducting the control and management of the OTN. One prominent protocol is referred to in the art as Generalized Multiprotocol Label Switching (GMPLS).

Generalized Multiprotocol Label Switching (GMPLS) is a type of protocol which extends multiprotocol label switching (MLS) to encompass network schemes based upon time-division multiplexing (e.g. SONET/SDH, PDH, G.709), wavelength multiplexing, and spatial switching (e.g. incoming port or fiber to outgoing port or fiber). Multiplexing is when two or more signals or bit streams are transferred over a common channel. Wave-division multiplexing is a type of multiplexing in which two or more optical carrier signals are multiplexed onto a single optical fiber by using different wavelengths (that is, colors) of laser light.

RSVP and RSVP-TE signaling protocols may be used with GMPLS. To set up a connection in an Optical Transport Network, nodes in the Optical Transport Network exchange messages with other nodes in the Optical Transport Network using RSVP or RSVP-TE signaling protocols. Resources required for the connection are reserved and switches inside the network are set. Information sent by signaling protocols are often in a type-length-value (TLV) format. The same protocols may also be used to take down connections in the Optical Transport Network when the connections are no longer needed.

OSPF and OSPF-TE routing and topology management protocols may also be used with GMPLS. Under OSPF protocols, typically each node in an Optical Transport Network maintains a database of the network topology and the current set of resources available, as well as the resources used to support traffic. In the event of any changes in the network, or simply periodically, the node floods the updated topology information to all the Optical Transport Network nodes. The nodes 20 use the database information to chart routes through the Optical Transport Network.

Traffic Engineering (TE) is a technology that is concerned with performance optimization of operational networks, such as OTNs. In general, Traffic Engineering includes a set of applications, mechanisms, tools, and scientific principles that allow for measuring, modeling, characterizing and control of user data traffic in order to achieve specific performance objectives.

Current Traffic Engineering practices have been utilized to increase the data rates in networks. However, future information transport systems are expected to support service upgrades to data rates of one terabyte per second (Tbps) and beyond. To accommodate such high rates in transport network architectures, multi-carrier Super-Channels coupled with advanced multi-level modulation formats and flexible channel spectrum bandwidth allocation schemes may be utilized. Conventional wavelength switched optical networks are based on a fixed ITU-T DWDM wavelength frequency grid. A frequency grid is a reference set of frequencies used to denote allowed nominal central frequencies that may be used for defining applications. Historically, the frequency grid defined by the ITU-T G.694.1 recommendations supported a variety of fixed channel spacings ranging from 12.5 GHz to 100 GHz and wider (integer multiples of 100 GHz). Uneven channel spacings within the fixed grid were also allowed.

The fixed grid-based approach does not seem adapted to new data rates beyond 100 Gbps, and it is particularly inefficient when a whole wavelength is assigned to a lower speed optical path (e.g., 10 Gb/s) that does not fill the entire wavelength capacity. To enable scaling of existing transport systems to ultrahigh data rates of 1 Tb per second and beyond, next-generation systems providing super channel switching capability are currently being developed. To allow efficient allocation of optical spectral bandwidth for such high bit rate systems, International Telecommunication Union Telecommunication Standardization Sector (ITU-T) is extending the G.694.1 grid standard (termed "fixed-grid") to include a flexible grid support.

In particular, the recent revision of ITU-T Recommendation [G.694.1] has decided to introduce the flexible grid DWDM technique which provides a new tool that operators can implement to provide a higher degree of network optimization than fixed grid systems. The flexible grid DWDM technique provides a plurality of spectral slices within the frequency grid that can be arbitrarily assigned or aggregated to provide frequency slots having one or more spectral slices. Further, frequency slots can be defined having different amounts of spectral slices to provide the frequency slots with different widths. This means in such networks that an adjacent channel spacing and assigned spectral bandwidth per wavelength are variable to form a mixed bitrate transmission system. Mixed bitrate transmission systems can allocate their channels with different spectral bandwidths so that they can be optimized for the bandwidth requirements of the particular bit rate and modulation scheme of the individual channels.

This technique is regarded as a promising way to improve the network utilization efficiency and to fundamentally reduce the cost of the core network. Based on the DWDM technique, Wavelength Switched Optical Network (WSON) uses a control plane of the switch node to dynamically provide Label Switched Paths (LSPs) for the requested end to end connections. The label switching is performed selectively on wavelength labels representing the center wavelength/frequency of the frequency slot.

However, there is not currently a method or system for the nodes within the optical network to effectively advertise unreserved bandwidth within the optical network using the flexible grid system resulting in underutilization of the resources within the optical network. What is needed are techniques in which nodes within an optical network can advertise available bandwidth that can be used to set up variable bandwidth connections using the techniques defined, for example, in ITU-T G.694.1. Techniques for advertising available bandwidth in an optical network using the flexible grid systems are disclosed herein.

SUMMARY

A method and system are disclosed. The problem of underutilization of an optical mesh network due to ineffective advertisement of unreserved bandwidth within the optical mesh network is addressed by the generation and transmission of a link state advertisement message conforming to a Generalized Multiprotocol Label Switching (GMPLS) routing protocol. The link state advertising message is associated with a TE Link between a transmit node and a receive node in a network. The transmit node supplies a plurality of optical signals, each of which has a plurality of frequencies, the frequencies being allocated among a plurality of spectral portions such that the plurality of spectral portions are grouped into a plurality of frequency slots. The link state advertising message may include information indicative of a number of spectral portions, e.g., spectral slices, which correspond to frequencies of selected ones of the plurality of optical signals, said selected ones of the plurality of optical signals being available to carry data from the transmit node to the receive node. The link state advertising message may be transmitted from the transmit node to the receive node such that a label switched path in accordance with the number of the plurality of spectral portions can be established. The information indicative of a number of spectral portions in the link state advertising message may include slice spacing information, and an identification of unreserved spectral slices of the bandwidth to permit establishment of the label switched path using the unreserved spectral slices. The label switched paths can be working connections, high-priority protecting connections, and low-priority protecting connections. The information in the link state advertising message can be saved in a link state database and used for computing routes or paths in the optical transport network for setting up label switched paths in networks having multiple nodes communicating via communication links. By way of example, the methodologies set forth herein are described in the context of GMPLS based traffic engineering (TE) routing for Dense Wave-Division Multiplexing in Optical Transport Networks.

The methodologies and systems allow nodes to learn the optical signal attributes of Super-Channels using new Link State Advertising Messages and in turn advertise the optical signal attributes and in-use and unreserved spectral portion, e.g., slice information, of Super-Channels to other nodes in the network. New Super-Channels can be calculated taking into account the optical signal attributes, in-use slices and unreserved slices of the existing Super-Channels.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 5 is a schematic of an exploded view of an exemplary new Super-Channel Parameters GMPLS signaling extension data structure in accordance with the present disclosure.

DETAILED DESCRIPTION

Figure 1:
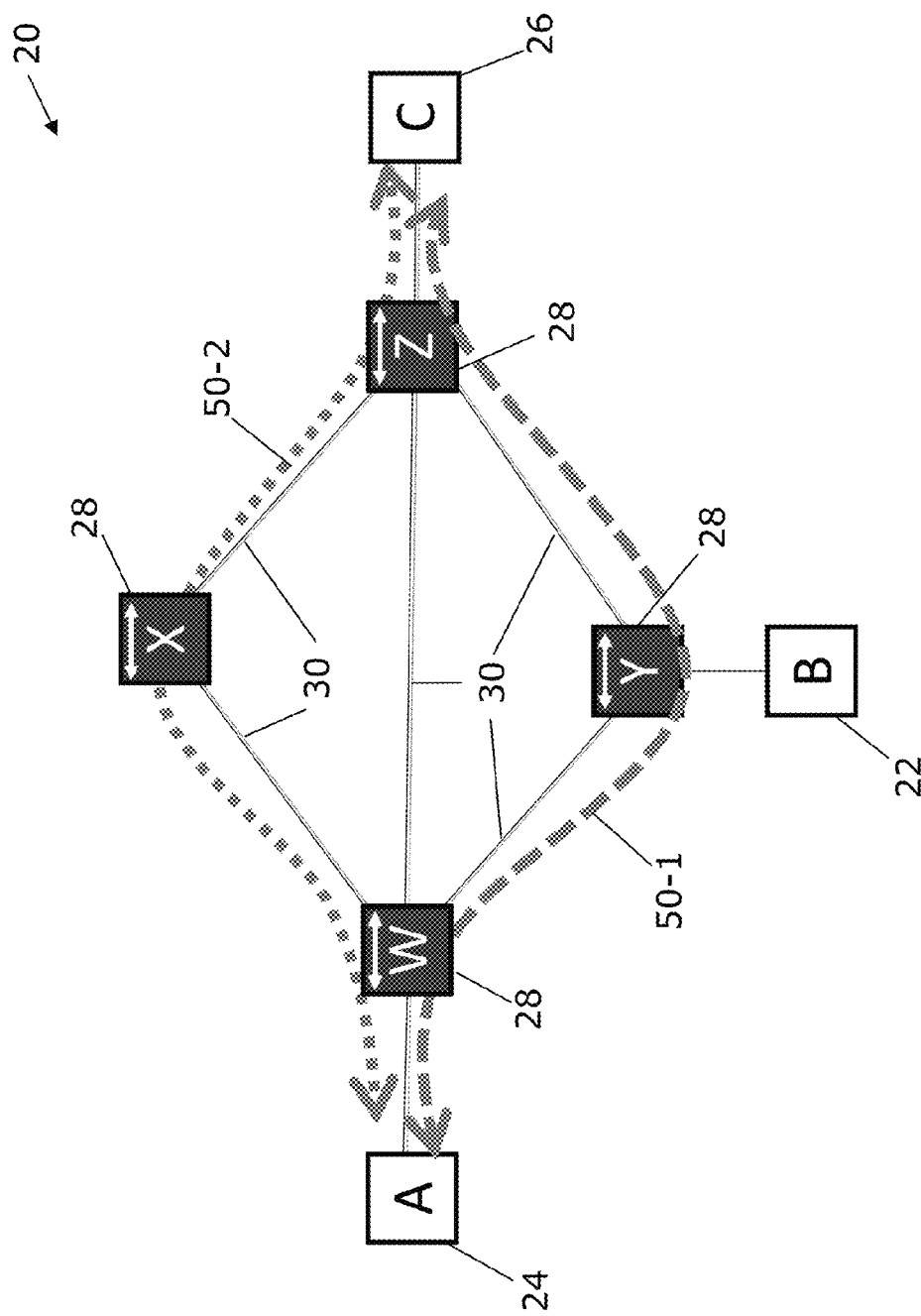
FIG. 1 is a block diagram of an exemplary Optical Transport Network.

The following detailed description refers to the accompanying drawings. The same reference numbers in different drawings may identify the same or similar elements.

The mechanisms proposed in this disclosure circumvent the problems described above. The problem of underutilization of an optical network due to ineffective advertisement of unreserved bandwidth within the optical network is addressed by addressed by the generation and transmission of a link state advertisement message conforming to a Generalized Multiprotocol Label Switching (GMPLS) routing protocol. The link state advertising message is associated with a TE Link between a transmit node and a receive node in a network. The transmit node supplies a plurality of optical signals, each of which has a plurality of frequencies, the frequencies being allocated among a plurality of spectral portions such that the plurality of spectral portions are grouped into a plurality of frequency slots. The link state advertising message may include information indicative of a number of spectral portions, e.g., spectral slices, which correspond to frequencies of selected ones of the plurality of optical signals, said selected ones of the plurality of optical signals being available to carry data from the transmit node to the receive node. This can be accomplished by including slice spacing information and an identification of the unreserved spectral slices of bandwidth in a Bandwidth sub TLV in the Link-State Advertising message passed between Control Planes of nodes.

DEFINITIONS

If used throughout the description and the drawings, the following short terms have the following meanings unless otherwise stated:

BW stands for Bandwidth. Bandwidth is the data transfer capacity of a link or connection in the Optical Transport Network, which may be expressed in optical data units, bits per second, number of time slots, or expressed by other methods.

CSPF stands for Constrained Shortest Path First, also referred to as Constrained SPF. CSPF is a network protocol which utilizes algorithms for choosing a network path that is the shortest path fulfilling a set of constraints.

DWDM stands for dense wavelength division multiplexing. DWDM multiplexes multiple optical carrier signals, such as Optical Channel (OCh) signals or Super-Channel (SCh) signals, onto a single optical fiber by using different laser light wavelengths (colors).

FEC stands for Forward Error Correction.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (for example, incoming port or fiber to outgoing port or fiber). The GMPLS framework includes a set of signaling and routing protocols which may run, for example, on a control module of a node. The GMPLS routing protocol distributes network topology information through the network so that the route of a label switch path can be calculated. An interior gateway protocol such as OSPF may be used. The GMPLS signaling protocol informs the switches (also known as nodes) along the route the signal takes in the network which labels and links to use for each label switch path. This information is used to program the switching fabric. RSVP protocol may be used for GMPLS transport of traffic. When traffic engineering is required to establish label switch paths with guaranteed Quality of Service characteristics and backup label switch paths that avoid any single point of failure, the traffic engineering (TE) extensions to these protocols are used (OSPF-TE and RSVP-TE respectively). In general, an extension is a set of features/processes/information added to a protocol. The Generalized Multiprotocol Label Switching architecture is defined, for example, in RFC 3471, RFC 3473, and RFC 3945.

A GMPLS "extension" is a term for added features to the GMPLS protocol, as defined by the Internet Engineering Task Force (IETF) (RFC 4775, Procedures for Protocol Extensions). The term GMPLS routing extension refers to an addition to the GMPLS protocol of additional features/processes/information to be used in routing through an Optical Transport Network. The term GMPLS signaling extension refers to an addition to the GMPLS protocol of additional features/processes/information to be used in signaling in an Optical Transport Network.

IETF stands for Internet Engineering Task Force.

ISCD stands for Interface Switching Capability Descriptor. The Interface Switching Capability Descriptor is a sub-TLV (of type 15) of a Link TLV. The ISCD contains a Switching Capability-Specific Information (SCSI) field. ISCD is further defined in RFC 4203, "OSPF Extensions in Support of Generalized Multi-Protocol Label Switching (GMPLS)."

LSA stands for Link State Advertisement. Link State Advertisements may be used, for example, in OSPF protocol to send information about the Optical Transport Network to and from nodes in the Optical Transport Network. LSAs are further described in IETF RFC 5340.

LSP stands for Label Switched Path which is a path through a Generalized Multi-Protocol Label Switching network. Note that Label Switched Paths can be bidirectional or unidirectional. LSPs enable packets to be label switched through the Generalized Multi-protocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OADM stands for optical add/drop multiplexer. ROADM stands for reconfigurable optical add/drop multiplexer.

The term "optical carrier" is commonly used by those skilled in the art to mean a defined particular wavelength (frequency) and optical bandwidth (the supported optical channel bandwidth plus source stability) that carries data in an Optical Transport Network. (As described in ITU-T Recommendation G.872, "Architecture of optical transport networks," Section 5.4.) Data can be imposed on the optical carrier by increasing signal strength, varying the base frequency, varying the wave phase, or other means. The term "frequency slot" is defined as a frequency range allocated to a given channel and unavailable to other channels with the same flexible grid (FLEX-GRID).

OSPF stands for "Open Shortest Path First." OSPF is a network routing protocol. OSPF is further defined in RFC 2328 and RFC 5340. OSPF-TE stands for OSPF Traffic Engineering. OSPF-TE is an extension of the OSPF network routing protocol for use with GMPLS incorporating traffic engineering OTN stands for Optical Transport Network which includes a set of optical switch nodes which are connected by optical fiber links. ITU-T recommendations G.709 and G.872 define OTN interface requirements and network architecture respectively.

RSVP stands for Resource ReserVation Protocol. RSVP is a network signaling protocol.

RSVP-TE stands for Resource ReserVation Protocol Traffic Engineering. RSVP-TE is an extension of RSVP network signaling protocol for use with GMPLS incorporating traffic engineering.

SCh stands for Super Channel. A Super-Channel (SCh) is provisioned in an Optical Transport Network as one optical channel or as an individual optical channel. That is, although the Super-Channel is a composite of multiple optical carriers or channels, collectively, the optical carriers within a super-channel are routed together through the Optical Transport Network and the Super-Channel is managed and controlled in the Optical Transport Network as though it included only one optical channel or carrier at one wavelength. In reality, each Super-Channel can have multiple wavelengths that are contiguous in the spectrum or non-contiguous in the spectrum.

SONET/SDH stands for Synchronous Optical Networking/Synchronous Digital Hierarchy which are standardized multiplexer protocols that transfer multiple digital bit streams over optical fiber using lasers or light emitting diodes.

Spectral Slice is the minimum granularity of a frequency slot (for example, 12.5 GHz), also referred to as "frequency slice" or "slice".

Slot width is the full width of a frequency slot in a flexible grid (FLEX-GRID). The slot width is equal to number of spectral slices in the frequency slot times the width of spectral slice.

TE stands for Traffic Engineering. Traffic Engineering is a technology that is concerned with performance optimization of operational networks. In general, TE includes a set of applications mechanisms, tools, and scientific principles that allow for measuring, modeling, characterizing and control of user data traffic in order to achieve specific performance objectives TE Link stands for Traffic Engineering Link. A TE Link is a logical link that has TE properties. The link represents a way to group/map the information about certain physical resources (and their properties) into the information that is used by Constrained SPF for the purpose of path computation, and by GMPLS signaling. TE links are further described in RFC 4202.

TLV stands for type-length-value.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In accordance with the present disclosure, messages transmitted between the nodes can be processed by circuitry within the input interface(s), and/or the output interface(s) and/or the control module. Circuitry could be analog and/or digital, components, or one or more suitably programmed microprocessors and associated hardware and software, or hardwired logic. Also, certain portions of the implementations may be described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

An exemplary Optical Transport Network (OTN) 20 is shown in FIG. 1, by way of example. In FIG. 1, the Optical Transport Network includes switch nodes 22 (hereinafter referred to as "nodes"). Some of the nodes 22 are denoted as a headend node 24 (also known as a source node) or tailend node 26 (also known as a destination node) for a particular path in accordance to the path setup direction. Other nodes 22 between the headend node 24 and tailend node 26 in a particular path are known as intermediate nodes 28. In this example, the Optical Transport Network 20 includes headend node 24 A, tailend node 26 C, and intermediate nodes 28 W, X, Y, and Z. In between the nodes 22 are communication links 30, also known as intermediate links or Traffic Engineering (TE) links. The OTN 20 may be configured in any topology, for example, linear, ring, or mesh. The OTN 20 may include one or more wired and/or wireless networks. For example, the OTN 20 may include a cellular network, a public land mobile network (PLMN), a 2G network, a 3G network, a 4G network, a 5G network, a wide area network, a telephone network, an intranet, the Internet, a fiber optic-based network and/or another type of network or a combination of types of networks.

The nodes 22 may be digital and/or optical. In the exemplary Optical Transport Network (OTN) 20 illustrated in FIG. 1, nodes 24A, 22B, and 26C are digital nodes, while nodes 28W, 28×, 28Y, and 28Z are optical nodes. An exemplary OTN 20 may contain multiple optical nodes, such as optical line terminals (OLTs), optical crossconnects (OXCs), optical line amplifiers, optical add/drop multiplexer (OADMs) and/or reconfigurable optical add/drop multiplexers (ROADMs), interconnected by way of communication links. Optical nodes are further described in U.S. Pat. No. 7,995,921 titled "Banded Semiconductor Optical Amplifiers and Waveblockers" and U.S. Pat. No. 7,394,953 titled "Configurable Integrated Optical Combiners and Decombiners", which are incorporated herein by reference in their entirety.

Figure 2:
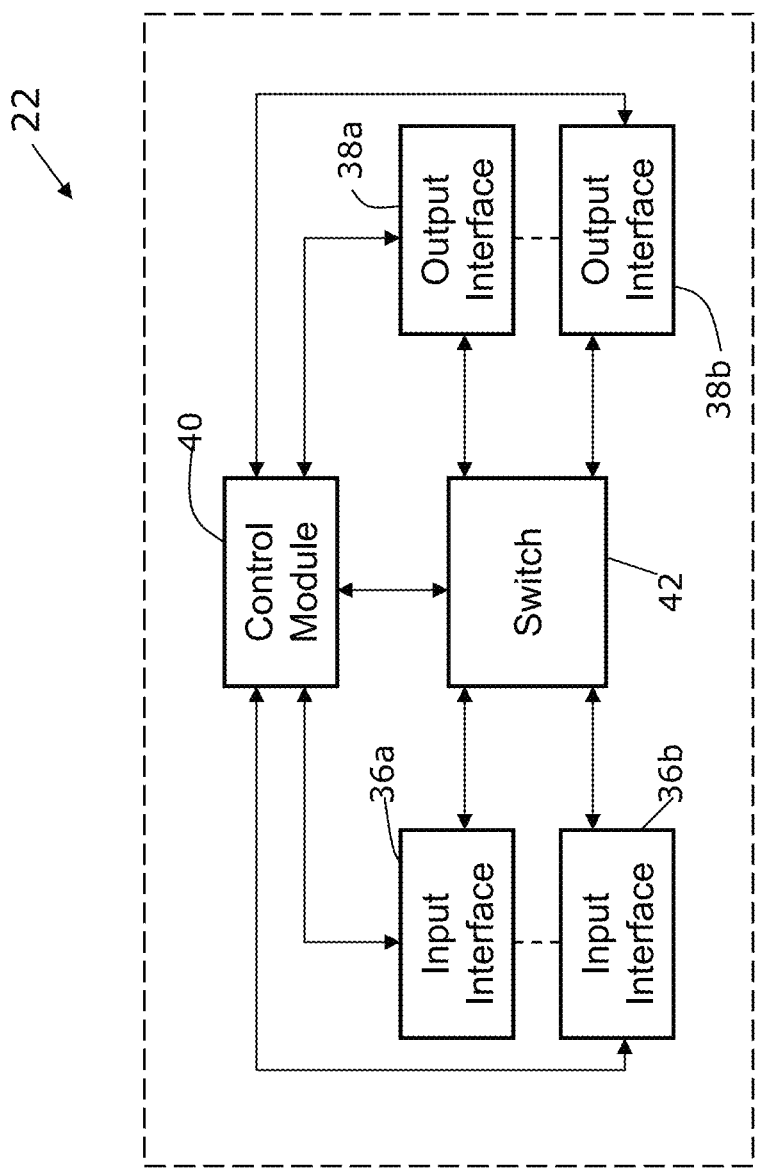
FIG. 2 is a block diagram of an exemplary node in the Optical Transport Network.

Referring now to FIG. 2, shown therein and designated by reference numeral 22 is an exemplary node 22 constructed in accordance with the present disclosure. The general exemplary configuration shown may apply to either digital or optical nodes. As will be discussed in more detail below, the node 22 is adapted to facilitate the communication of data (which may be referred to herein as "traffic") between multiple nodes 22 in an Optical Transport Network (OTN) 20 (as shown in FIG. 1). The node 22 in OTN 20 maintains a database of the topology of the OTN 20 and the current set of network resources available, as well as the resources used to support traffic in the OTN 20. The node 22 is provided with one or more input interfaces 36, one or more output interfaces 38, a control module 40, and a switch 42. The node 22 in FIG. 2 is shown by way of example with two input interfaces 36a-36b and two output interfaces 38a-38b; however node 22 may have any number of input interfaces 36 and output interfaces 38. The node 22 may also include non-transitory memory (not shown), either within the control module 40 and/or the switch 42, or separate from the control module 40 and/or the switch 42. The nodes in FIG. 1 can be constructed in a similar manner as the node 22.

In general, the input interfaces 36 are adapted to receive traffic from the Optical Transport Network 20, and the output interfaces 38 are adapted to transmit traffic onto the Optical Transport Network 20. Multiple output interfaces 38 can supply corresponding optical signals, which are also known as optical carriers or optical channels. The switch 42 serves to communicate the traffic from the input interface(s) 36, to the output interface(s) 38. And, the control module 40 serves to control the operations of the input interfaces 36, the output interfaces 38, and the switch 42. The control module 40 can be referred to herein as a control plane 44. The control plane 44 may use a variety of protocols to setup one or more connections in the Optical Transport Network.

The node 22 can be implemented in a variety of manners, including commercial installations having one or more backplanes (not shown), racks, and the like. In one example, the input interfaces 36, the output interfaces 38, the control module 40 and the switch 42 are typically implemented as separate devices, which may have their own power supply, local memory and processing equipment. In another example, the node 22 can be implemented as a single device having a shared power supply, memory and processing equipment. Or, in another example, the node 22 can be implemented in a modular manner in which one or more of the input interfaces 36, the output interfaces 38, the control module 40 and the switch 42 share a power supply and/or housing.

The input interfaces 36, and the output interfaces 38 of one node 22 are adapted to communicate with corresponding input interfaces 36, and output interfaces 38 of another node 22 within the Optical Transport Network 20 via a communication link 30 (as shown in FIG. 1). An example of an input interface 36 and/or an output interface 38 is an Ethernet card or optical port. In general, each of the input interfaces 36 and/or the output interfaces 38 may have a unique logical identification, such as an IP address. The communication link 30 can be implemented in a variety of manners, such as a physical link including electrical (e.g., copper wire or coax) and/or optical signal (e.g., optical fiber or other waveguide) carrying capabilities, or as a wireless link. The implementation of the input interfaces 36, and the output interfaces 38 will depend upon the particular type of communication link 30 that the particular input interface 36 and/or output interface 38 is designed to communicate with. For example, one of the input interfaces 36 can be designed to communicate wirelessly with another node 22 within the Optical Transport Network 20, while one of the output interfaces 38 of the node 22 can be designed to communicate optically through a fiber-optic link. For a particular node 22, the input interfaces 36 can be of the same type or different types; the output interfaces 38 can be of the same type or different types; and the input and output interfaces 36 and 38 can be of the same type or different types.

In accordance with the present disclosure, messages transmitted between the nodes 22, can be processed by circuitry within the input interface(s) 36, and/or the output interface(s) 38 and/or the control module 40.

Though some variations have been described herein, it should be understood that the node 22 can be implemented in a variety of manners as is well known in the art.

Figure 3:
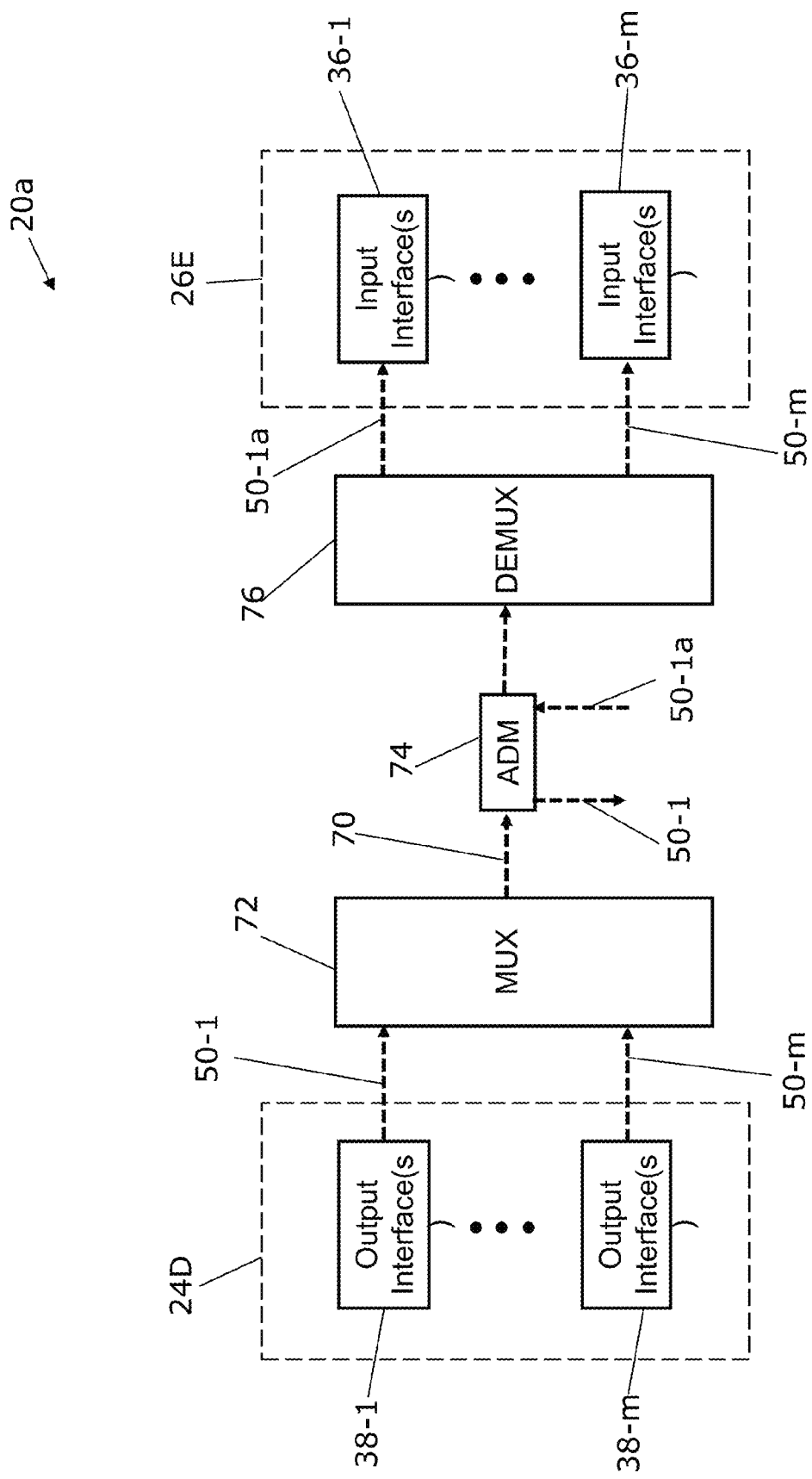
FIG. 3 is a block diagram of an exemplary Optical Transport Network consistent with the present disclosure.

Referring now to FIG. 3, FIG. 3 is a block diagram of an exemplary Optical Transport Network (OTN) 20a consistent with the present disclosure. A network management system, as described in greater detail below may be used in conjunction with OTN 20a. Within the exemplary OTN 20a, a node 22, such as node 24D, may act as a source node 24 and may establish a network path with a destination node 26, such as node 26E.

The source node 24D may have a plurality of output interfaces 38-1 to 38-m (also referred to as transmitter circuits or blocks), each of which may supply corresponding optical channels 52-1 to 52-m (also known as optical signals). Each of the optical channels 52-1 to 52-m may be a corresponding Super-Channel 50-1 to 50-m. A Super-Channel 50, as generally understood, may be a composite signal including or made up of a plurality of optical carriers, each of which having a corresponding one of a plurality of wavelengths and each being modulated to carry a corresponding one of a plurality of data streams.

The source node 24D may establish the Super-Channels 50 associated with the network path that allows traffic to be transported via the Super-Channels 50. The Super-Channel 50 may permit the traffic to be transmitted, via the network path, at a high collective data rate, for example, greater than or equal to one terabytes per second (Tbps), greater than two Tbps, greater than five Tbps, etc.

Figure 4:
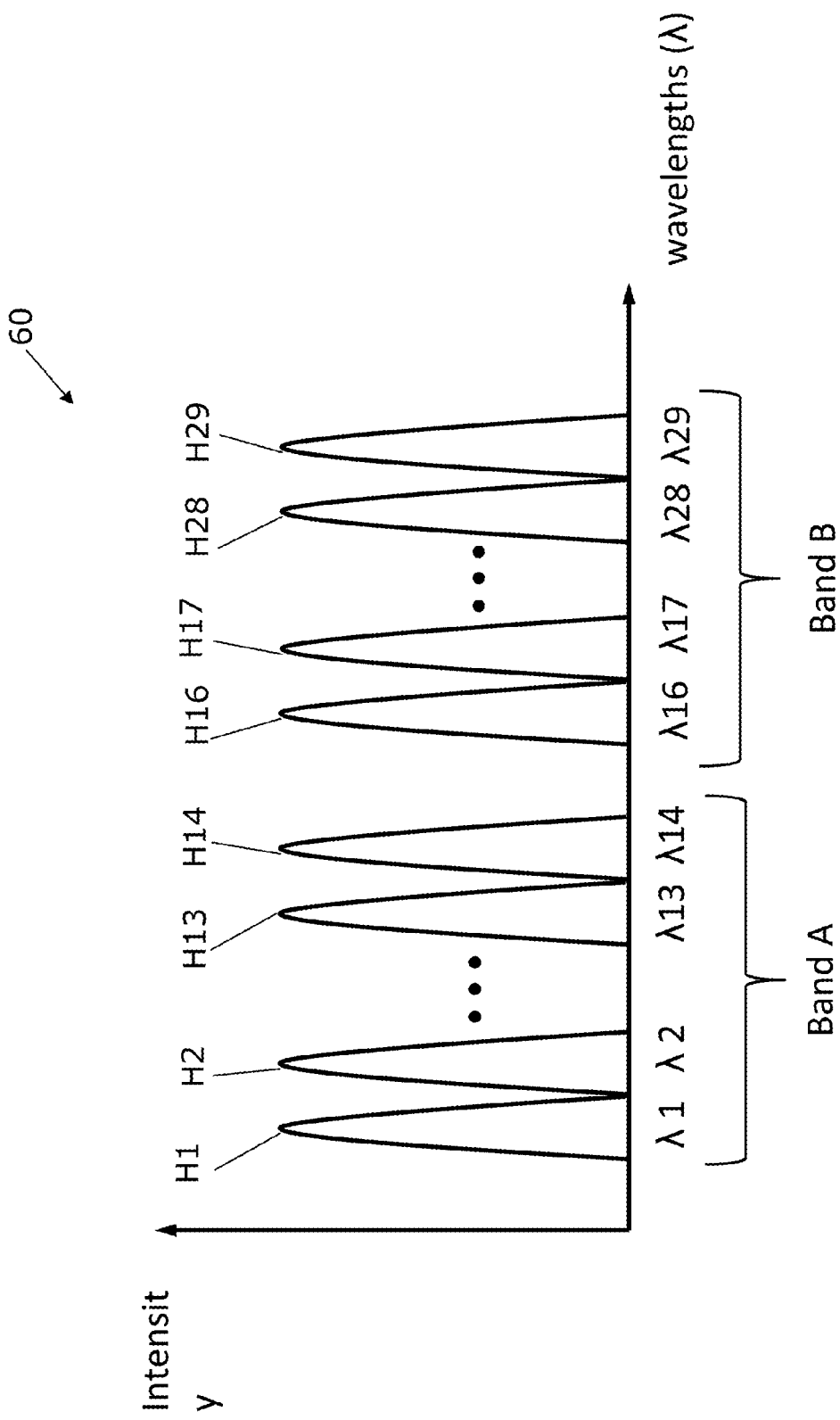
FIG. 4 is a schematic of an exemplary Super-Channel frequency spectrum consistent with the present disclosure.

An exemplary frequency spectrum (FS) 60 associated with two Super-Channels 50-1 and 50-2 is shown in FIG. 4. As shown in FIG. 4, Super-Channel 50-1 includes a plurality of optical signals (also known as optical carriers), each of which having a corresponding one of a plurality of wavelengths λ1 to λ14 within Band A, and Super-Channel 50-2 includes a plurality of optical carriers, each of which having a corresponding one of a plurality of wavelengths λ16 to λ29 within Band B. Each "hump" H1 to H14 in Band A is indicative of a peak intensity associated with a corresponding one of wavelengths λ1 to λ14 in band A. Accordingly, each "hump" H1 to H14 is representative of an optical carrier in Super-Channel 50-1, and, likewise, each "hump" H16 to H29 is representative of an optical signal in Super-Channel 50-2. It is understood that each Super-Channel may include fewer optical carriers or more optical carriers than those discussed above.

Preferably, the frequency spacing between adjacent one of wavelengths λ1 to λ14 in Band A of Super-Channel 50-1, for example, is equal to or substantially equal to a baud rate associated with one of the data streams, e.g., 50 GHz, and the wavelengths may be in a known C-band. The wavelength spacing, however, need not be uniform, but may vary within a given Super-Channel band, such as Band A.

Returning to FIG. 3, each Super-Channel 50-1 to 50-m is provisioned in OTN 20a as one optical channel or as an individual optical channel. That is, although each Super-Channel 50-1 to 50-m is a composite of multiple optical carriers or channels, collectively, the optical carriers within a super-channel are routed together through OTN 20a and the Super-Channel 50 is managed and controlled in the OTN 20a as though it included only one optical channel or carrier at one wavelength. In reality, each Super-Channel can have multiple wavelengths.

As generally understood, provisioning of an optical channel may include designating a path for such optical signal through an OTN 20. For example, one optical channel may be transmitted along a series of elements in the OTN 20 that are configured as a ring, and another channel, transmitted in the same network, can be provisioned to be transmitted between only two elements, i.e., a point-to-point configuration.

In FIG. 3, Super-Channels 50-1 to 50-m are combined onto optical communication path (OCP) 70 by optical combiner or multiplexer (MUX) 72. Super-Channels 50-1 to 50-m may next propagate along OCP 70 to, for example, an optional add-drop multiplexer (ADM) 74 which may be configured to drop one of the Super-Channels, in this example Super-Channel 50-1, while allowing the remaining Super-Channels 50-2 to 50-m to continue propagating toward a destination node 26E. Dropped Super-Channel 50-1 may be provided to equipment (not shown) that may be provided to demodulate and/or otherwise process Super-Channel 50-1 to output the data streams carried by dropped Super-Channel 50-1. Here, Super-Channel 50-1 has been provisioned to be transmitted from source node 24D to add-drop multiplexer ADM 74.

As further shown in FIG. 3, add-drop multiplexer ADM 74 may add an additional service channel Super-Channel 50-1a having optical carriers at the same or substantially the same wavelengths as Super-Channel 50-1 to optical communication path (OCP) 70. Super-Channel 50-1a may then propagate to destination node 26E along with Super-Channels 50-2 to 50-m to optical demultiplexer (DEMUX) 76, which, in turn, may separate each Super-Channel 50-1a and 50-2 to 50-m and supply each to a corresponding input interface(s) 36-1 to 36-m (also known as receiver blocks or circuitry). Input interfaces 36 may detect each Super-Channel 50 and convert each Super-Channel 50 into one or more electrical signals, which are then processed to output the information associated with each data stream carried by the optical carriers in each Super-Channel 50.

The bandwidth spectrum of a Super-Channel 50 may be divided into "slices" of width, i.e. bandwidth segments, also known as frequency slices or spectral slices. The slices may be identified within a Super-Channel sub-time-length-value (sub-TLV) data structure, as will be discussed.

An optical node 22 capable of Super-Channel Switching advertises bandwidth availability by advertising slices of certain width available based on the frequency spectrum supported by the node 22 (for example, C-band, or extended C-band). The node 22 computing a label switch path (LSP) in the Optical Transport Network 20, such as source node 24A in FIG. 1, determines the number of slices required for the LSP and then looks for spectrum availability on each communication link 30, for example, in both directions, from bandwidth advertising. If spectrum bandwidth is available, the node 22 computing the network path then selects the link for LSP creation and signals for LSP creation, using current GMPLS protocol. Once the LSP is created, the node 22 updates the bandwidth available via a new advertisement to other nodes 22 in the Optical Transport Network 20 using a bandwidth sub-TLV conforming to current GMPLS protocol.

The node 22, for example intermediate node 28W in FIG. 1, may receive, from a source device such as source node 24A, an instruction to establish a Super-Channel 50, on an Optical Transport Network 20 path, via which aggregated traffic is to be transmitted to a destination device (not shown) via a destination node 26, for example node 26C. The instruction may specify a bandwidth to be used for the Super-Channel 50. The node 28W may generate allocation information to be used to establish a Super-Channel 50 based on contiguous and/or non-contiguous channel bandwidth allocation. The node 28W may store the Super-Channel 50 information in a data structure and may append the data structure to an information packet (for example, as a header, trailer, label, etc.) and or/embed the data structure within the packet (for example, within a packet payload, header, trailer, label, etc.). The node 28W may transmit the information packet to a destination node 26C, and possibly via one or more intermediate nodes 28, for example nodes 28Y and 28Z, that are located on the Optical Transport Network 20 path between the source node 24A and the destination node 26C. The intermediate nodes 28Y and 28Z and/or the destination node 26C may receive the packet and may reserve operating bandwidth to accommodate the Super-Channel 50 via which the aggregated traffic is to be transmitted.

Super-Channel 50 assignment using a flexible grid is further described in U.S. patent application Ser. No. 13/249,642, titled "SUPER-CHANNEL ASSIGNMENT USING A FLEXIBLE GRID" and U.S. Provisional Patent Application No. 60/559,199, titled "OSPFTE EXTENSION TO SUPPORT GMPLS FOR FLEX GRID", which are incorporated by reference.

However, when multiple Super-Channels 50 are established, for example, Super-Channels 50-1 and 50-2 in FIG. 1, the coexistence of Super-Channels 50 using different modulation formats on the same Optical Transport Network 20 infrastructure may have a detrimental effect on the Optical Signal to Noise Ratio (OSNR) of adjacent Super-Channels 50 due to interference such as cross-phase modulation.

New Super-Channel Parameters GMPLS Signaling and Routing Extensions

Before establishing new Super-Channels 50, information to evaluate the mutual impact of existing and new Super-Channels 50 on each other's quality of transmission (for example, bit error rate) can be communicated using new Super-Channel Parameters GMPLS signaling and routing extensions adapted to convey optical signal attributes of Super-Channels 50.

The optical signal attributes are Super-Channel 50 parameters that are useful in evaluating the mutual impact of existing and new Super-Channels 50 on quality of transmission of the Super-Channels 50. For example, optical signal attributes may include number (quantity) of wavelengths/optical carriers, wavelength/optical carrier center frequency, wavelength/optical carrier modulation, wavelength/optical carrier baudrate, and/or wavelength/optical carrier Forward Error Correction (FEC) type.

The number of wavelengths is indicative of how many wavelengths are in the Super-Channel 50.

The wavelength center frequency is indicative of the location of the frequency of the Super-Channel 50. The wavelength Center Frequency may be communicated in terahertz (THz).

The wavelength modulation is indicative of the modulation format/scheme used for each wavelength/carrier of the Super-Channel 50. The modulation format/scheme may be vendor-specified. The wavelength/optical carrier modulation may be indicative of how densely encoded the information is within the signal.

The wavelength baudrate is indicative of the speed of the signal of the Super-Channel 50. The wavelength baudrate may be expressed in gigabits per second (Gbit/s).

The wavelength FEC type is an indication of noise of the signal of the Super-Channel 50.

Nodes 22 along the Super-Channel 50 path can learn the optical signal attributes of the Super-Channel 50 using new Super-Channel Parameters GMPLS signaling extensions and in turn advertise the Super-Channel 50 optical signal attributes and in-use slice information, to other nodes 22 in the Optical Transport Network 20 using new Super-Channel Parameters GMPLS routing extensions. The optical signal attributes and in-use slice information may be used as constraints by the node utilizing CSPF protocol algorithms when setting up new Super-Channels 50.

For example, referring again to FIG. 1, source node 24A may send a signal along the Super-Channel 50-1 path to nodes 28W, 28Y, 28Z, and 26C. The signal may contain a protocol RSVP message conforming to new Super-Channel Parameters GMPLS signaling extensions containing optical signal attributes of the Super-Channel 50-1 in data structures that are described below. The message informs one or more nodes 22 along the Super-Channel 50-1 of the optical signal attributes of the Super-Channel 50-1. The optical signal attributes of the Super-Channel 50-1 may be received with an instruction to establish the Super-Channel 50-1, and/or may be received at another time.

The node 22 may notify, by circuitry of the node 22, software of the information indicative of Super-Channel 50-1 optical signal attributes. The node 22 may store the information regarding optical signal attributes in non-transitory memory following OSPF-TE protocol. Further, the node 22 may use the optical signal attribute information and in-use slice information in communication with other nodes 22 in the Optical Transport Network 20 using the new Super-Channel Parameters GMPLS routing extensions and following OSPF-TE protocol, for example, advertising the optical signal attributes and in-use slice information in OSPF-TE link state advertisements.

The nodes 28W, 28Y, 28Z, and 26C, along the Super-Channel 50-1 may advertise the optical signal attributes of the Super-Channel 50-1 to other nodes 22 in the Optical Transport Network 20, for example, nodes 28x and 22B, using the new Super-Channel Parameters GMPLS routing extensions and using OSPF protocol. In accordance with OSPF protocol, which is well known in the art, the new Super-Channel Parameters GMPLS routing extensions may be advertised through Link State Advertisements. As Super-Channels 50 change, and/or on a regular basis, the nodes 22 may send updated optical signal attribute and in-use slice information to other nodes 22 in the Optical Transport Network 20.

The nodes 22 in the Optical Transport Network 20 may use the optical signal attributes information and in-use slice information as an additional constraint when calculating algorithms to compute new Super-Channel 50 paths, such as 50-2 shown in FIG. 1, in accordance with the CSPF protocol. In this way, the new Super-Channel 50-2 may avoid interference with other Super-Channels 50, such as Super-Channel 50-1.

Next will be described exemplary embodiments of data structures and encoding for the new Super-Channel Parameters GMPLS Signaling Extensions, and also exemplary embodiments of data structures for the new Super-Channel Parameters GMPLS Routing Extensions.

Data Structures for the New Super-Channel Parameters GMPLS Signaling Extensions

As previously described, the information regarding optical signal attributes of the Super-Channel 50-1 may be contained in a RSVP message conforming to the new Super-Channel Parameters GMPLS signaling extensions transmitted via a signal from the source node 24, such as source node 24A in FIG. 1. In one embodiment, the message may be in the form of a new Super-Channel Carriers type-length-value (TLV) 100 data structure. FIG. 5 is a schematic of an exploded view of an exemplary new encoded Super-Channel Carriers TLV 100 data structure and sub-structures. As shown in FIG. 5, the Super-Channel Carriers TLV 100 may be structured to include at least one new Carrier sub-TLV 120. Further, the Carrier sub-TLV 120 may be structured to include zero or more new Carrier sub-sub-TLVs 130, as explained below.

Figure 5A:
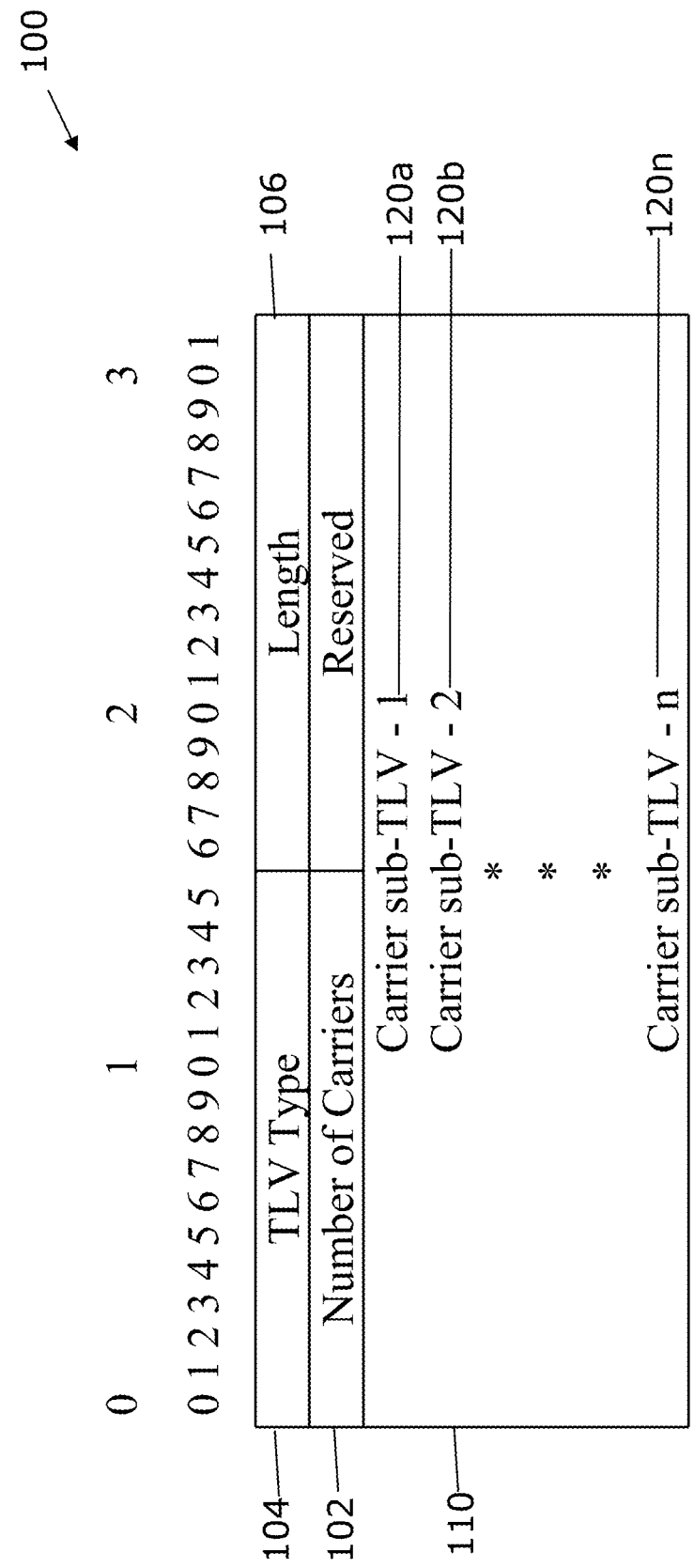
FIG. 5A is a schematic of an exemplary new Super-Channel Carriers TLV in accordance with the present disclosure.

FIG. 5A is a schematic of a top view of the exemplary new Super-Channel Carriers TLV 100. In the illustrated example, the Super-Channel Carriers TLV 100 includes a Number of Carriers field 102, a TLV Type field 104, a Length field 106, and a Carrier sub-TLV field 110 that may hold Carrier sub-TLV(s) 120 (Carrier sub-TLV-1, Carrier sub-TLV-2, . . . Carrier sub-TLV-n). The Length field 106 may be used to specify the length in octets of the complete set of TLVs including the set of sub-TLVs that follow. The Number of Carriers field 102 contains information indicative of quantity of carriers/wavelengths of the related Super-Channel 50-1. The Number of Carriers is one of the optical signal attributes of Super-Channel 50-1.

Figure 5B:
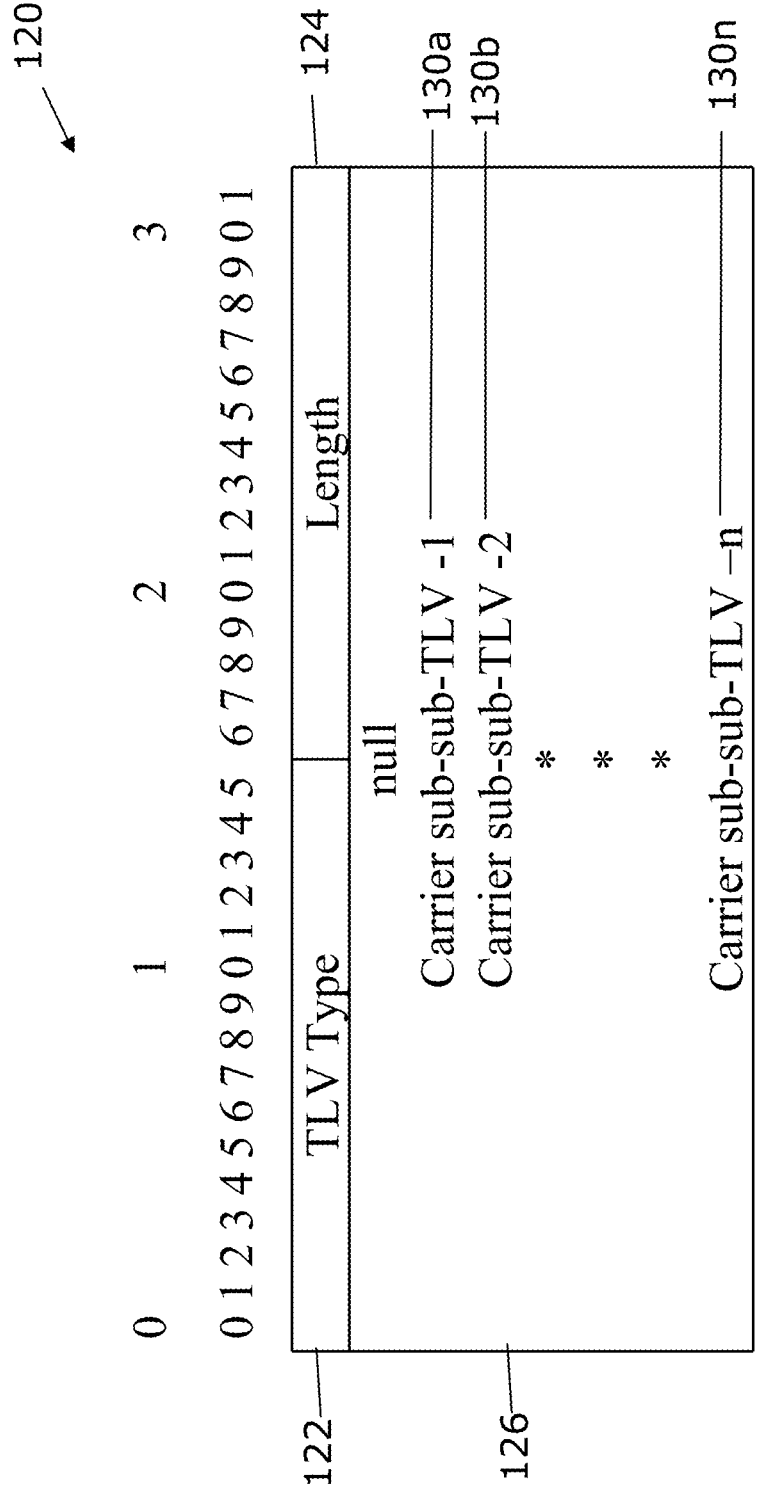
FIG. 5B is a schematic of an exemplary new Carrier Sub-TLV in accordance with the present disclosure.

FIG. 5B is a schematic of the exemplary new Carrier sub-TLV 120. The Carrier sub-TLV 120 may include a TLV Type field 122, a Length field 124, and a new Carrier sub-sub-TLV field 126 which may carry a new Carrier sub-sub-TLV 130 or multiple new Carrier sub-sub-TLVs 130 (Carrier sub-sub-TLV-1, Carrier sub-sub-TLV-2, . . . Carrier sub-sub-TLV-n), or no Carrier sub-sub-TLV 130. The Carrier sub-sub-TLV 130 may also carry additional information regarding optical signal attributes of a Super-Channel 50-1.

Figure 5C:
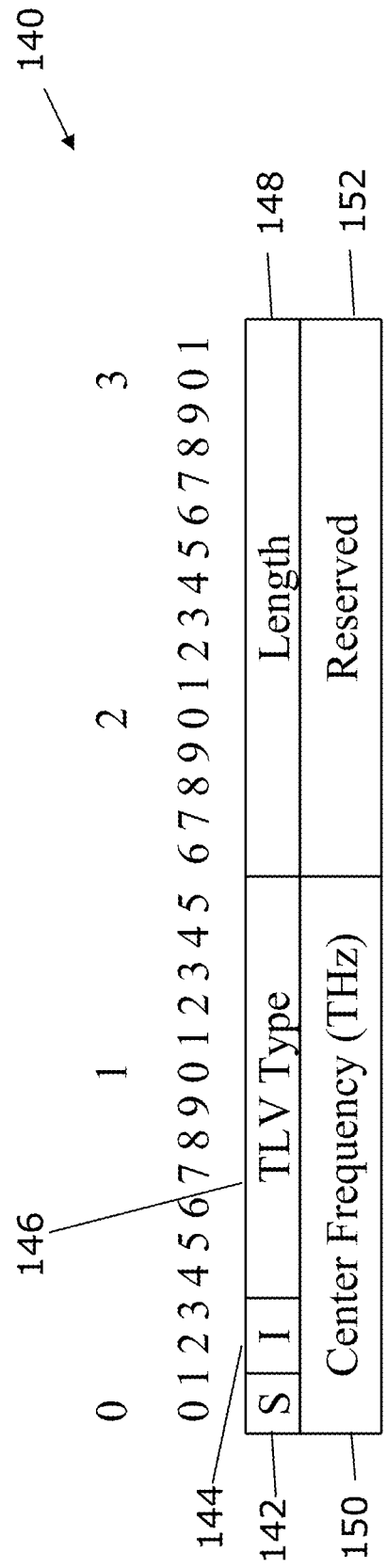
FIG. 5C is a schematic of an exemplary new Carrier Center Frequency sub-sub-TLV in accordance with the present disclosure.

For example, one type of new Carrier sub-sub-TLV 130 may be a Carrier Center Frequency sub-sub-TLV 140 as exemplified in the schematic of FIG. 5C. The Carrier Center Frequency sub-sub-TLV 140 may include an "S" field 142, an "I" field 144, a TLV Type field 146, a Length field 148, and a Carrier Center Frequency field 150. The bit in the "S" field 142 is indicative of whether the TLV contains standardized fields or vendor specific fields. In one embodiment, when the "S" bit in a TLV is set to one, the "S" bit indicates that the TLV contains standardized fields (for example, Modulation, FEC Type) and when the "S" bit is set to zero the "S" bit indicates a vendor-specific TLV. The "I" field 144 may contain a bit indicating whether the parameter is input or output. In one embodiment, when the "I" bit is set to one, the parameter is an input parameter. The Carrier Center Frequency field 150 may be used to carry information indicative of the center frequency. The Carrier Center Frequency is one of the optical signal attributes of the Super-Channel 50-1. The Carrier Center Frequency sub-sub-TLV 140 may also have one or more Reserved fields 152, reserved for future assignment and use.

Figure 5D:
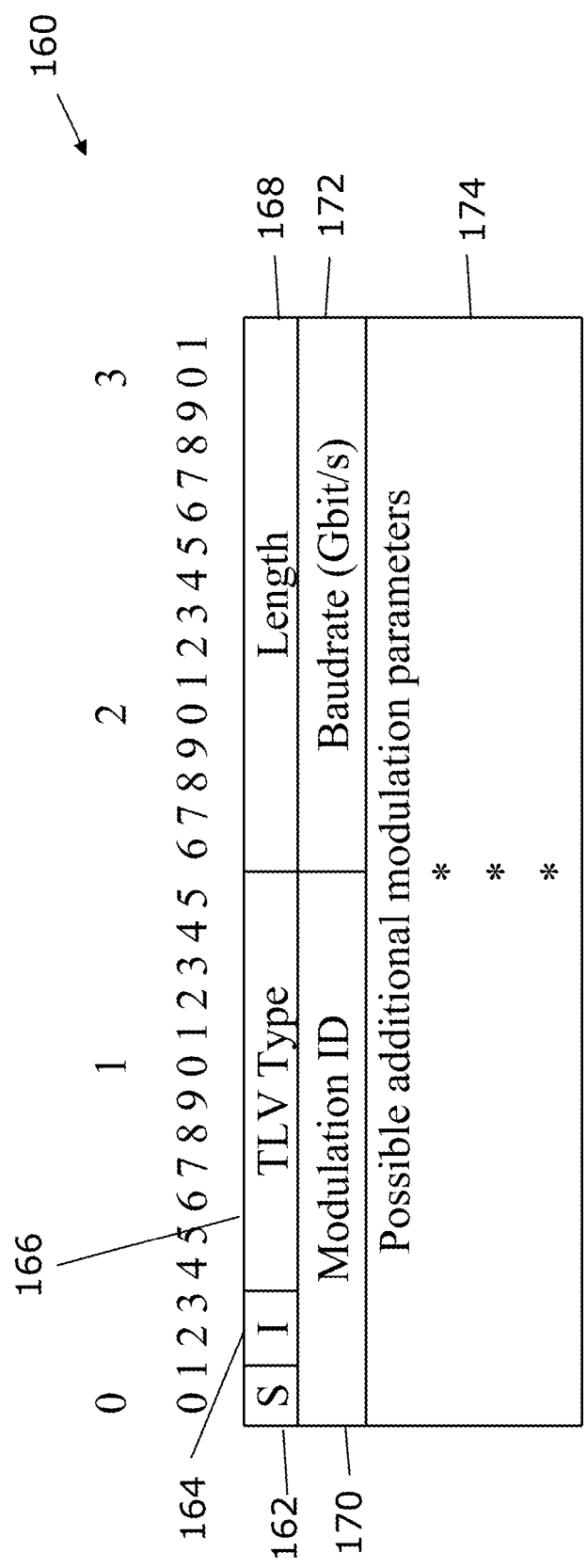
FIG. 5D is a schematic of an exemplary new Carrier Modulation sub-sub-TLV in accordance with the present disclosure.

Another example of a new Carrier sub-sub-TLV 130 is exemplified in FIG. 5D, which is a schematic of an exemplary Carrier Modulation sub-sub-TLV 160. The Carrier Modulation sub-sub-TLV 160 may include an "S" field 162, an "I" field 164, a TLV Type field 166, a Length field 168, a Carrier Modulation ID field 170, and a Carrier Baudrate field 172. The "S" field 162 and "I" field 164 may have similar definitions as those described for "S" field 142 and "I" field 144. The Carrier Modulation ID field 170 may carry information indicative of the density of encoded information in the signal. The Carrier Baudrate field 172 may carry information indicative of the speed of the signal. The Carrier Modulation ID and the Carrier Baudrate are optical signal attributes of the Super-Channel 50-1. The Carrier Modulation sub-sub-TLV 160 may also carry additional modulation parameters 174. For example, a system vendor may identify additional vendor-specific modulation parameters for use in the vendor system.

Figure 5E:
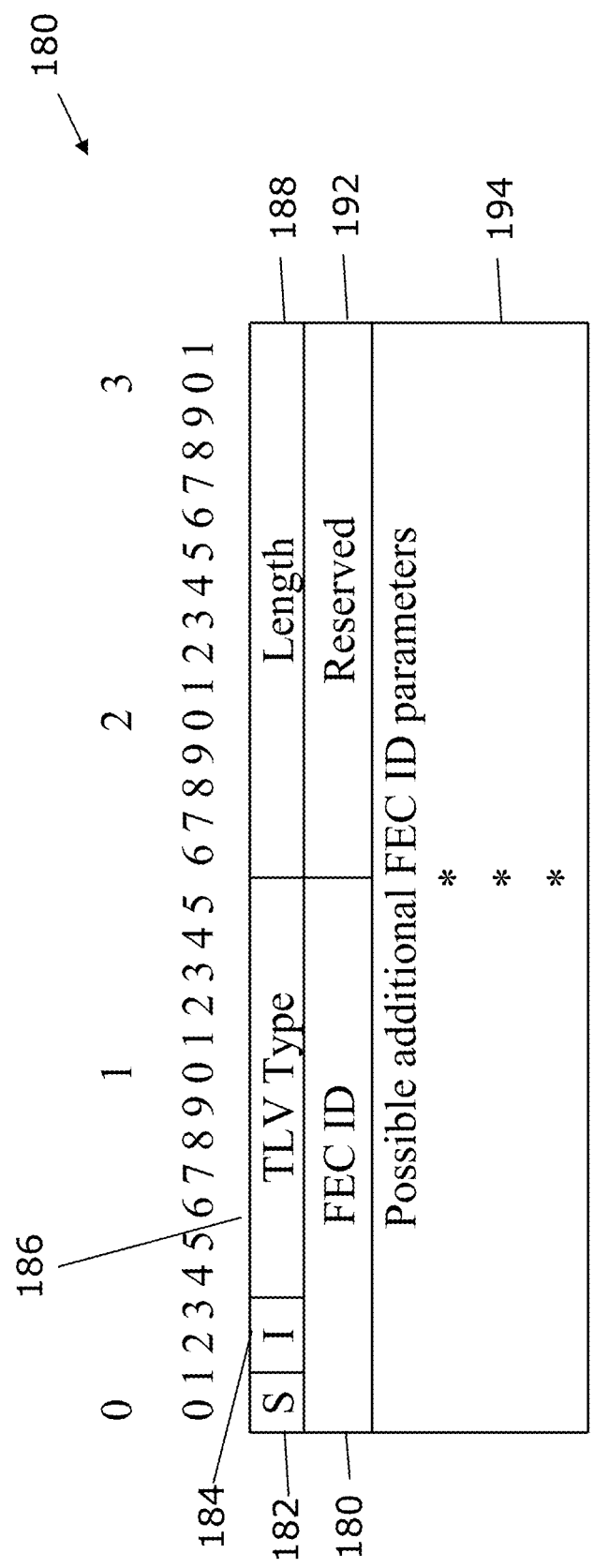
FIG. 5E is a schematic of an exemplary new Carrier Forward Error Correction (FEC) Type sub-sub-TLV in accordance with the present disclosure.

Yet another example of a new Carrier sub-sub-TLV 130 is exemplified in FIG. 5E, which is a schematic of an exemplary Carrier Forward Error Correction (FEC) Type sub-sub-TLV 180. The Carrier FEC sub-sub-TLV 180 may include an "S" field 182, an "I" field, a TLV Type field 186, a Length field 188, a FEC ID field 190, and a Reserved field 192. The "S" field 182 and "I" field 184 may have similar definitions as those described for "S" field 142 and "I" field 144. The FEC ID field 190 may carry information indicative of the noise present in the signal. The FEC ID is an optical signal attribute of the Super-Channel 50-1. The Carrier FEC sub-sub-TLV 180 may also carry additional FEC identification parameters. For example, a system vendor may identify additional FEC identification parameters 194 specific to use in a vendor system.

In practice, the Super-Channel Carriers TLV 100 data structure and sub-structures GMPLS signaling extensions may include additional fields, fewer fields, different fields, and/or differently arranged fields than are described with respect to the Super-Channel Carriers TLV 100 data structure and sub-structures for use with the new Super-Channel Parameters GMPLS signaling extensions.

Encoding the New Super-Channel Parameters GMPLS Signaling Extensions Data Structures The Super-Channel Carriers TLV 100 data structure and sub-structures for the new Super-Channel Parameters GMPLS signaling extensions described above may be encoded in multiple ways. For example, the Super-Channel Carriers TLV 100 data structure and sub-structures may be encoded in Resource ReserVation (RSVP) Protocol data objects, such as RSVP FLOWSPEC and/or TSPEC objects, which are well known in the art and will not be further described.

Alternatively, or additionally, the Super-Channel Carriers TLV 100 data structure and related sub-TLV and sub-sub-TLVs sub-structures for the new Super-Channel Parameters GMPLS signaling extensions may be encoded with a Super-Channel Label 200.

FIGS. 4A and 4B are diagrams of example Super-Channel Label 200 data structures that contain Super-Channel Carriers TLV 100 data structures and sub-structures as well as allocation information that identifies how spectral bandwidth is to be allocated to establish a Super-Channel 50. A type of Super-Channel Label 200 that identifies how spectral bandwidth is to be allocated to establish a Super-Channel 50 is described in U.S. patent application Ser. No. 13/249,642, titled "SUPER-CHANNEL ASSIGNMENT USING A FLEXIBLE GRID," which is incorporated by reference in its entirety.

Figure 6A:
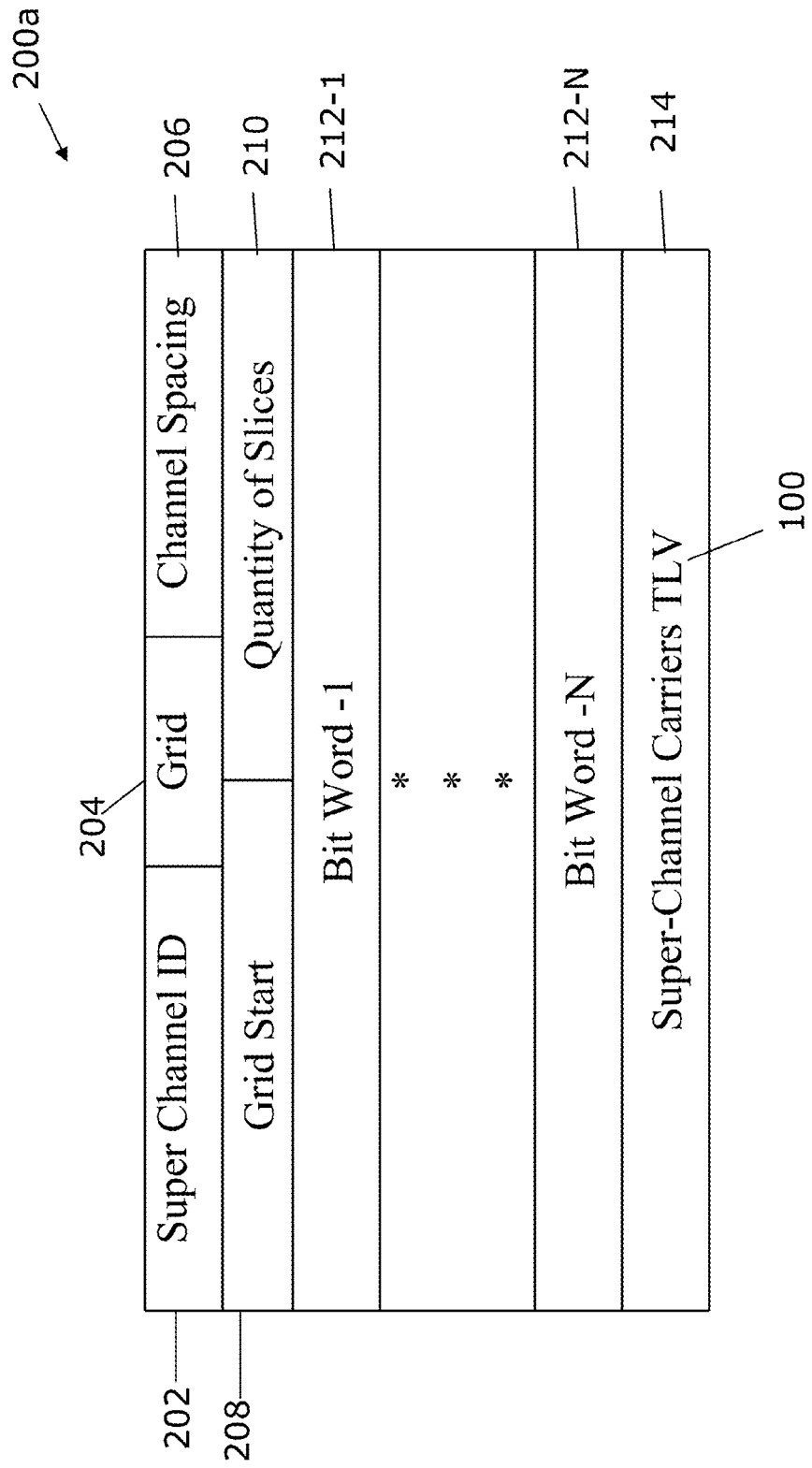
FIG. 6A is a schematic of an exemplary Super-Channel Label contiguous data structure in accordance with the present disclosure.

As illustrated in FIG. 6A, one form of Super-Channel Label 200 data structure is a contiguous Super-Channel Label 200a. Super-Channel Label 200a may include a collection of fields, such as a super-channel identifier (ID) field 202, a grid field 204, a channel spacing field 206, a grid start field 208, a quantity of slices field 210, a collection of bit word fields 212-1, . . . , 212-N (where N≥1) (hereinafter referred to collectively as "bit word fields 212" and individually as "bit word field 212"), and the new Super-Channel Carriers TLV field 214 containing the new Super-Channel Carriers TLV 100 described above in conjunction with FIGS. 5-5E.

Super-channel ID field 202 may store information (e.g., an identifier, a name, etc.) that uniquely identifies a Super-Channel 50 associated with node 22. Grid field 204 may store information (e.g., a particular value, a string, a flag, etc.) that indicates that a Super-Channel 50 is to be established based on a flexible-grid scheme. Channel spacing field 206 may store information that specifies a quantity of bandwidth associated with a channel spacing (e.g., 6.25 GHz, 12.5 GHz, 25 GHz, etc.) to be used when establishing the Super-Channel 50 based on the flexible-grid scheme.

Grid start field 208 may store information that identifies a particular frequency, within an operating bandwidth spectrum associated with node 22, at which the channel bandwidth starts. Grid start field 208 may identify a location associated with a flexible-grid allocation scheme where a first bit word, identified in bit word field 212-1, is to start.

Quantity of slices field 210 may store information that identifies a quantity of bandwidth segments (i.e. slices) to be included in the channel bandwidth allocation to be used to establish the Super-Channel 50. Each slice may correspond to a quantity of bandwidth that corresponds to the channel spacing identified in channel spacing field 206. The channel bandwidth may be based on the channel spacing and the quantity of slices (e.g., channel bandwidth may be approximately equal to CS*S, where CS represents the channel spacing and where S represents the quantity of slices).

Bit word field 212 may store a fixed quantity of bits (e.g., 16 bits, 32 bits, 64 bits, etc.) associated with a particular bit word. Each bit may be used to reserve a particular slice to be used by the Super-Channel 50. For example, a bit set to a first value (e.g., "1" or some other value) may cause a slice, within the channel bandwidth, to be reserved. In another example, a bit set to a second value (e.g., "zero" or some other value) may cause a slice not to be reserved. Additionally, or alternatively, the quantity of slices, identified in quantity of slices field 210 may correspond to a quantity of bit words. For example, if the fixed quantity of bits, associated with a first bit word (e.g., stored in bit word field 212-1) is greater than, or equal to, the quantity of slices, then contiguous Super-Channel Label 200a may include only the first bit word. In another example, if the fixed quantity of bits is less than the quantity of segments, then contiguous Super-Channel Label 200a may store more than one bit word (e.g., in bit word field 212-2, etc.). For example, a first bit word and a second bit word may be specified based on the quantity of slices. The first bit word and the second bit word may be contiguous. For example, a first bit associated with the second bit word may be adjacent to a last bit associated with the first bit word.

The new Super-Channel Carriers TLV field 214 stores the Super-Channel Carriers TLV 100 data structure and related sub-TLV and sub-sub-TLVs sub-structures described previously in conjunction with FIGS. 5-5E. As described previously, the Super-Channel Carriers TLV 100 includes optical signal attribute information such as number of wavelengths, wavelength center frequency, wavelength modulation, wavelength baudrate, and/or wavelength Forward Error Correction (FEC) type.

Contiguous Super-Channel Label 200a includes the fields listed above for explanatory purposes. In practice, contiguous Super-Channel Label 200a may include additional fields, fewer fields, different fields, and/or differently arranged fields than are described with respect to contiguous Super-Channel Label 200a.

Figure 6B:
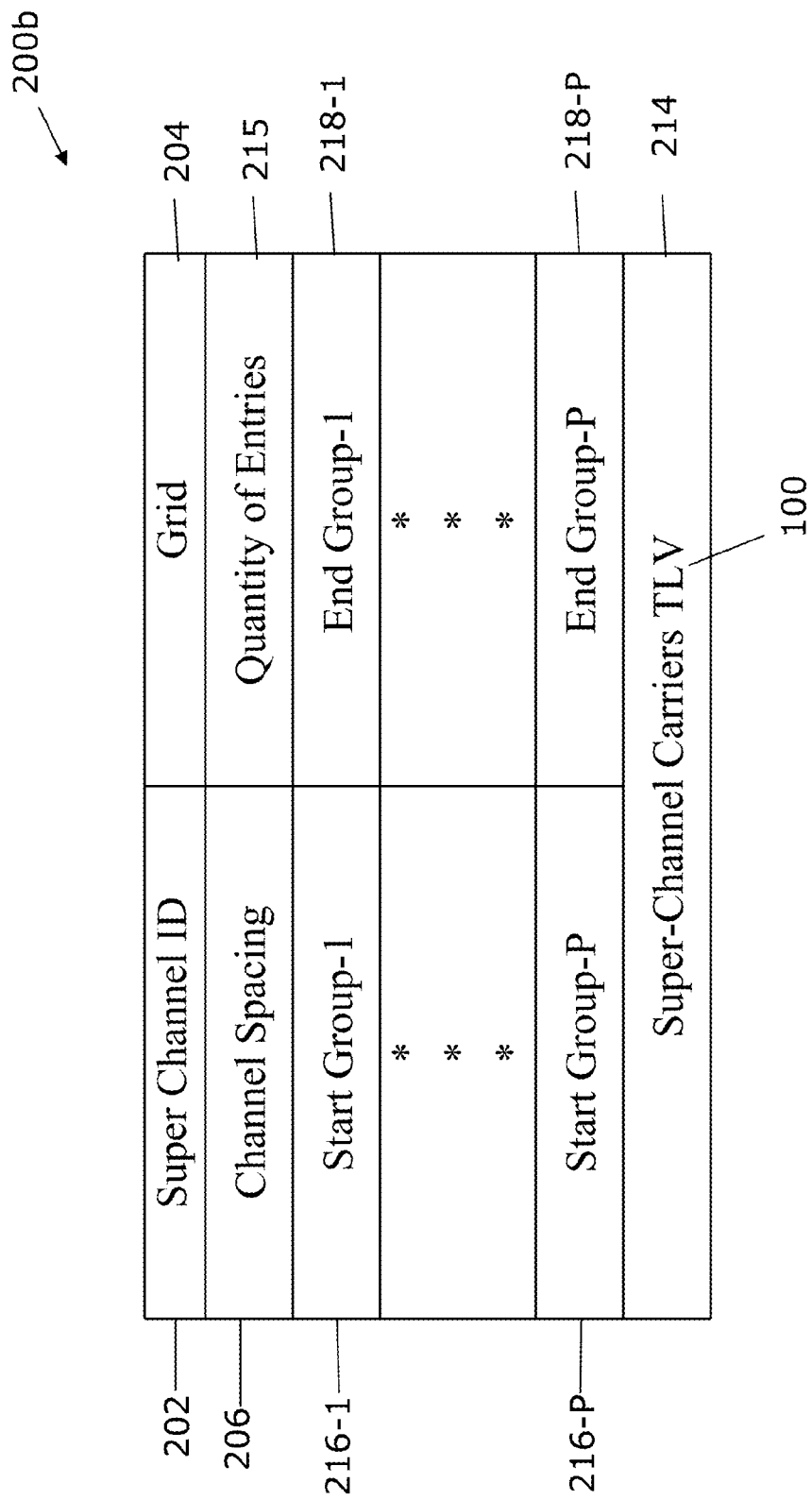
FIG. 6B is a schematic of an exemplary Super-Channel Label non-contiguous data structure in accordance with the present disclosure.

As illustrated in FIG. 6B, another form of Super-Channel Label 200 data structure is a non-contiguous Super-Channel Label 200b. Non-contiguous Super-Channel Label 200b data structure may include fields 202-206 as described above with respect to FIG. 6A. Non-contiguous Super-Channel Label 200b may also include a collection of fields, such as a quantity of entries field 215, a collection of start group fields 216-1, . . . , 216-P (where P≥1) (hereinafter referred to collectively as "start group fields 216" and individually as "start group field 216"), and a collection of end group fields 218-1, . . . , 218-P (where P≥1) (hereinafter referred to collectively as "end group fields 218" and individually as "end group field 218"). Non-contiguous Super-Channel Label 200b also includes the new Super-Channel Carriers TLV field 214, which contains the Super-Channel Carriers TLV 100 described above in conjunction with FIGS. 5-5E.

Quantity of entries field 215 may store information that identifies a quantity of pairs of start and end pointers that are used to identify first and last slices associated with non-contiguous bandwidth allocations to be used to establish the Super-Channel 50. Start group field 216 may store information that corresponds to a start pointer that identifies a slice within an operating bandwidth spectrum associated with node 22. In one example, start group field 216 may store a start pointer that identifies a left-most slice (e.g., associated with a lowest frequency) associated with a non-contiguous allocation. End group field 218 may store information that corresponds to an end pointer that identifies a slice within the operating bandwidth spectrum. In one example, end group field 218 may store an end pointer that represents a right-most slice (e.g., that corresponds to a highest frequency) associated with the non-contiguous allocation.

Start group field 216 and end group field 218 may, thus, define a beginning and an end of a contiguous group of slices on which a non-contiguous allocation is based. Start group field 216 and end group field 218 may cause the group of slices to be reserved to establish the Super-Channel 50.

A pair of fields, that include start group field 216 and end group field 218, may be included in non-contiguous Super-Channel Label 200b for each entry identified in quantity of entries field 215. For example, if quantity of entries field 215 indicates that two non-contiguous bandwidth allocations are to be included in non-contiguous Super-Channel Label 200b, then two pairs of fields 216 and 218 may be included in non-contiguous Super-Channel Label 200b. Additionally, or alternatively, the two non-contiguous bandwidth allocations may not be contiguous. For example a first non-contiguous bandwidth allocation may not be adjacent to a second non-contiguous bandwidth allocation, such that there may be unallocated slices between a last slice of the first allocation and the first slice of the second allocation.

The Super-Channel Carriers TLV field 214 contains the Super-Channel Carriers TLV 100 data structure and related sub-TLV and sub-sub-TLVs sub-structures described previously in conjunction with FIGS. 5-5E. As described previously, the Super-Channel Carriers TLV 100 includes optical signal attribute information such as number of wavelengths, wavelength center frequency, wavelength modulation, wavelength baudrate, and/or wavelength Forward Error Correction (FEC) type.

Non-contiguous Super-Channel Label 200b includes the fields shown for explanatory purposes. In practice, non-contiguous Super-Channel Label 200b may include additional fields, fewer fields, different fields, and/or differently arranged fields than are described with respect to non-contiguous Super-Channel Label 200b.

Of course, it should be understood that the Super-Channel Carriers TLV 100 data structure and related sub-TLV and sub-sub-TLVs sub-structures for the new Super-Channel Parameters GMPLS signaling extensions may be encoded with other objects transmitted in the Optical Transport Network.

Data Structures for the New Super-Channel Parameters GMPLS Routing Extensions

In general, extensions to the OSPF routing protocol (i.e. routing extensions) may be used in support of carrying link state information for GMPLS. The new Super-Channel Parameters GMPLS routing extensions may be used to advertise the optical signal attributes and in-use slices of the Super-Channel 50 via OSPF-TE link state advertisements (LSA) using a new Super-Channel TLV 400.

Specifically, the new Super-Channel TLV 400 may be used to advertise the optical signal attributes carried in the Super-Channel Carriers TLV 100 data structure and sub-structures, as previously described in conjunction with FIGS. 5-5E. The new Super-Channel TLV 400 may also be used to advertise information indicative of a number of spectral portions, which correspond to frequencies of selected ones of the plurality of optical signals. The selected ones of the plurality of optical signals are available to carry data from a one of the nodes 22, which may be referred to herein as a "transmit node" to another one of the nodes 22, which may be referred to herein as a "receive node". The information indicative of the number of the spectral portions may include, for example, in-use slice information. In-use slice information is indicative of which Super-Channel 50 is using a given set of slices and how the slices are being used by the Super-Channel 50, for example, the modulation, FEC type, and other parameters.

To advertise the optical signal attribute and in-use slice information, the new Super-Channel TLV 400 may include new In-Use Slices sub-TLV(s) 500 and Super-Channel Carriers TLV 100 sub-TLV(s) (using the Super-Channel Carriers TLV 100 data structure, as previously described in conjunction with FIGS. 5-5E).

Figure 7:
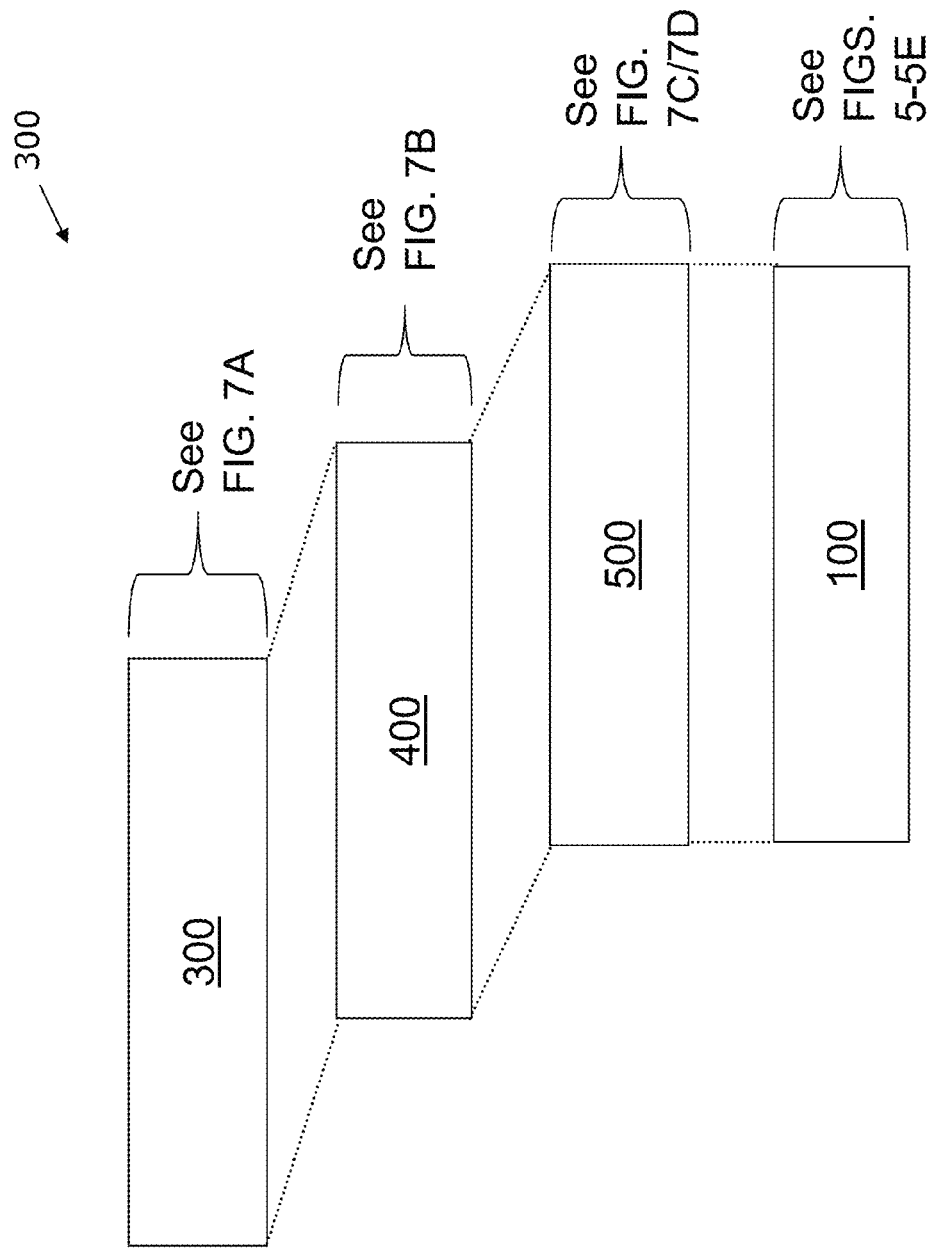
FIG. 7 is a schematic of an exploded view of an exemplary new Super-Channel Parameters GMPLS routing extension Interface Switching Capability Descriptor (ISCD) data structure in accordance with the present disclosure.

The Super-Channel TLV 400 may be carried in the Interface Switching Capability Descriptor (ISCD) 300 data structure Switching Capability-Specific Information (SCSI) 302 field, as exemplified in the exploded view of the Interface Switching Capability Descriptor (ISCD) 300 data structure depicted in FIG. 7. A standard ISCD 300 data structure is further defined in RFC 4203, "OSPF Extensions in Support of Generalized Multi-Protocol Label Switching (GMPLS)."

Figure 7A:
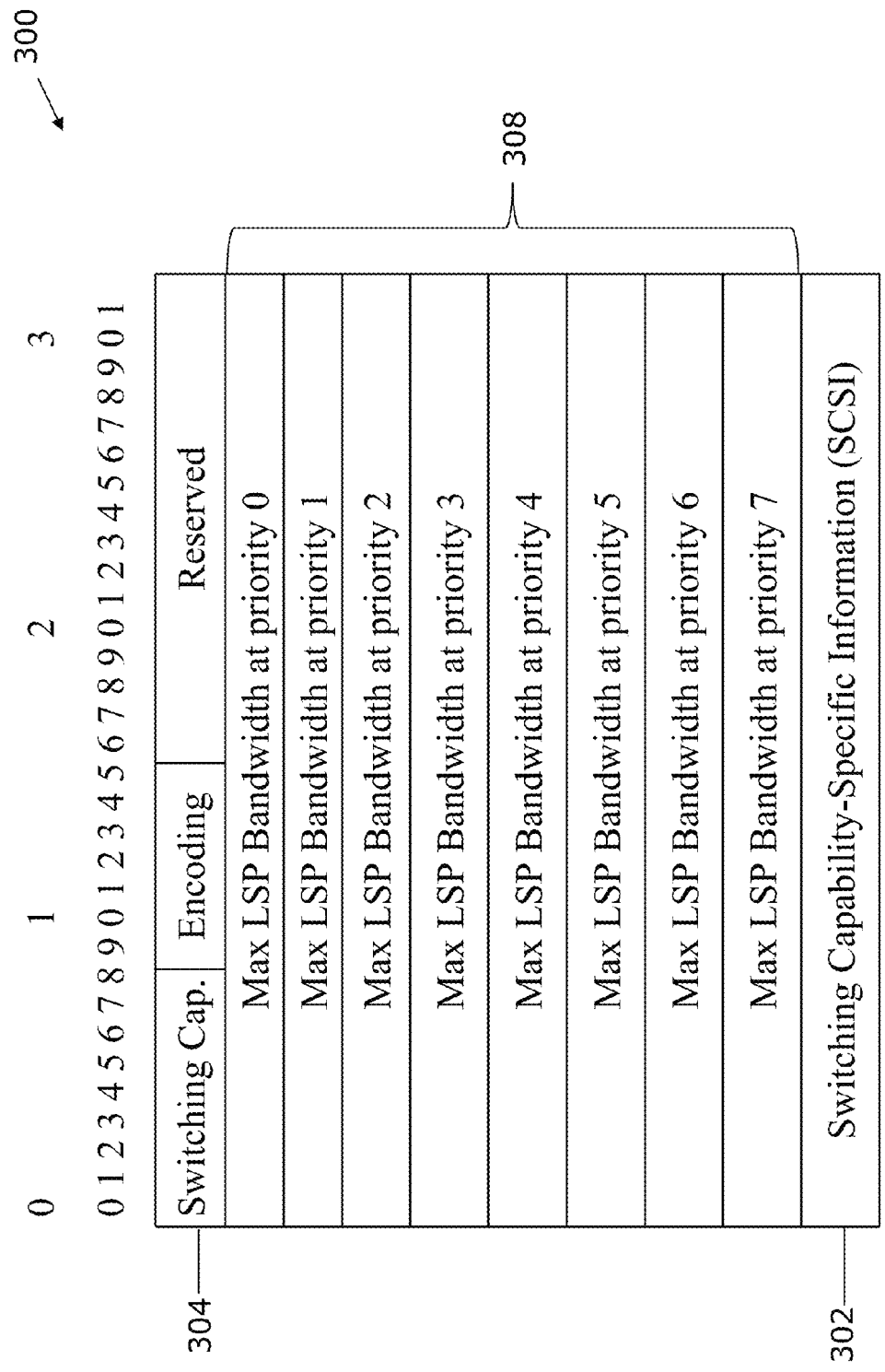
FIG. 7A is a schematic of an exemplary Interface Switching Capability Descriptor (ISCD) data structure in accordance with the present disclosure.

A schematic of a top view of an exemplary Interface Switching Capability Descriptor (ISCD) 300 is shown in FIG. 7A. The ISCD 300 is a sub-TLV (of type 15) of a Link TLV. A Link TLV is an OSPF TLV as defined in IETF RFC 4203. The ISCD 300 may describe switching capability of an interface. The ISCD 300 may have a Super-Channel-Switch-Capable (SCSC) field 304. The value in the SCSC field 304 may be one hundred and two, as described in U.S. Provisional Patent Application No. 60/559,199, titled "OSPFTE EXTENSION TO SUPPORT GMPLS FOR FLEX GRID", which is incorporated by reference. The ISCD 300 may also contain Max LSP Bandwidth fields 308 indicating the maximum LSP bandwidth at different priority levels.

The ISCD 300 additionally contains a Switching Capability-Specific Information (SCSI) field 302. The SCSI field 302 may contain sub-TLVs, such as the new Super-Channel TLV 400.

Figure 7B:
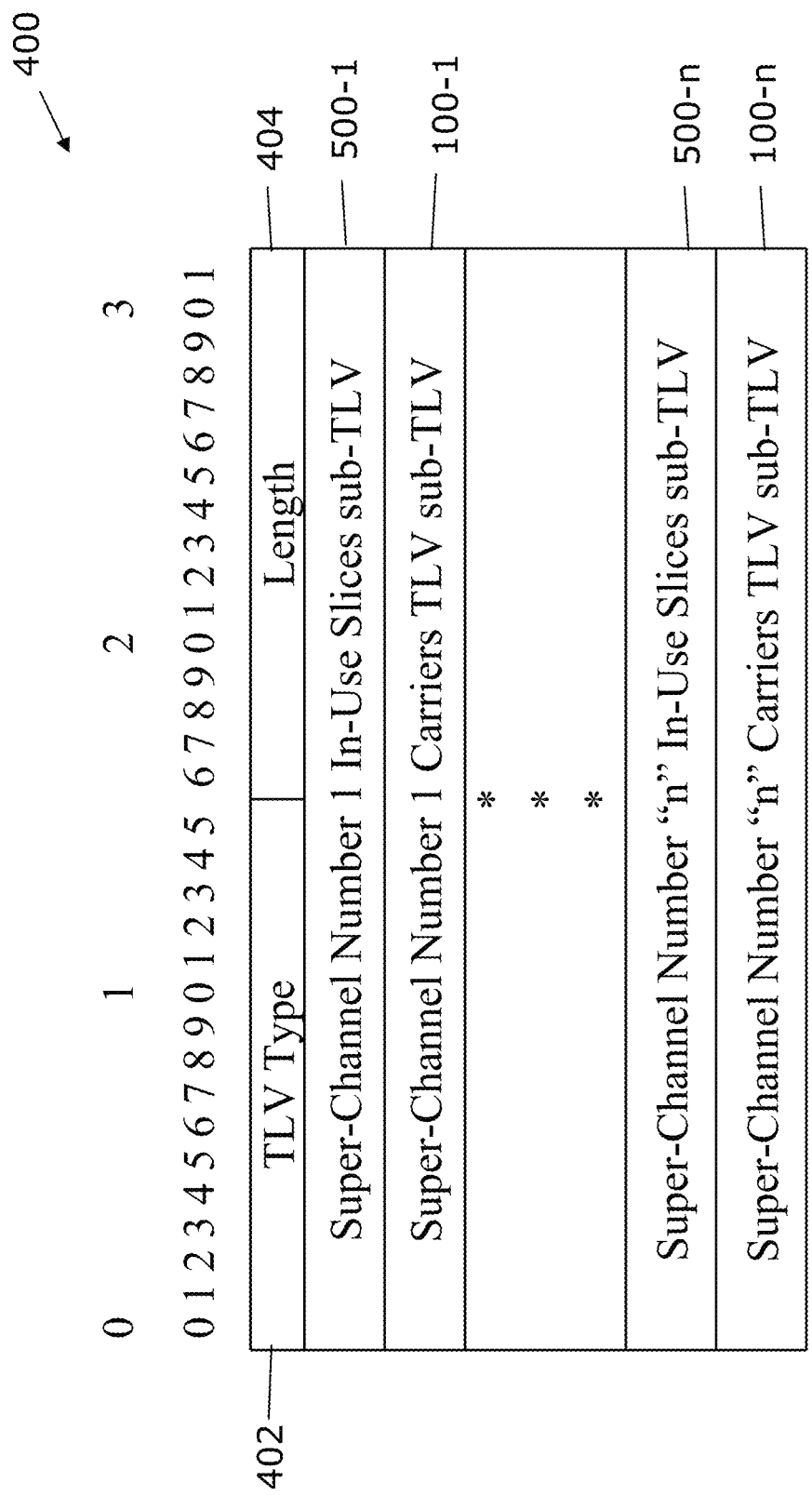
FIG. 7B is a schematic of an exemplary new Super-Channel TLV in accordance with the present disclosure.

A schematic of an exemplary new Super-Channel TLV 400 is shown in FIG. 7B. The Super-Channel TLV 400 may contain TLV type 402 and TLV Length 404. The Super-Channel TLV 400 may further contain the new Super-Channel Carriers TLV 100 sub-TLV data structures (100-1, . . . 100-n), as described previously in conjunction with FIGS. 5-5E, related to the Super-Channels 50 (e.g. Super-Channel-50-1, . . . Super-Channel-50-n) in the Optical Transport Network 20. As described previously, the Super-Channel Carriers TLV 100 includes optical signal attribute information such as number of wavelengths, wavelength center frequency, wavelength modulation, wavelength baudrate, and/or wavelength Forward Error Correction (FEC) type.

The Super-Channel TLV 400 may also contain new Super-Channel In-Use Slices sub-TLV 500 data structures (500-1, ... 500-*n*) related to advertising reserved or unreserved spectral slices of the bandwidth to permit establishment of a label switched path using the unreserved spectral slices. For example, the label switched path can include the Super-Channels 50 (e.g. Super-Channel-50-1, ... Super-Channel-50-*n*) in the Optical Transport Network 20.

Figure 7C:
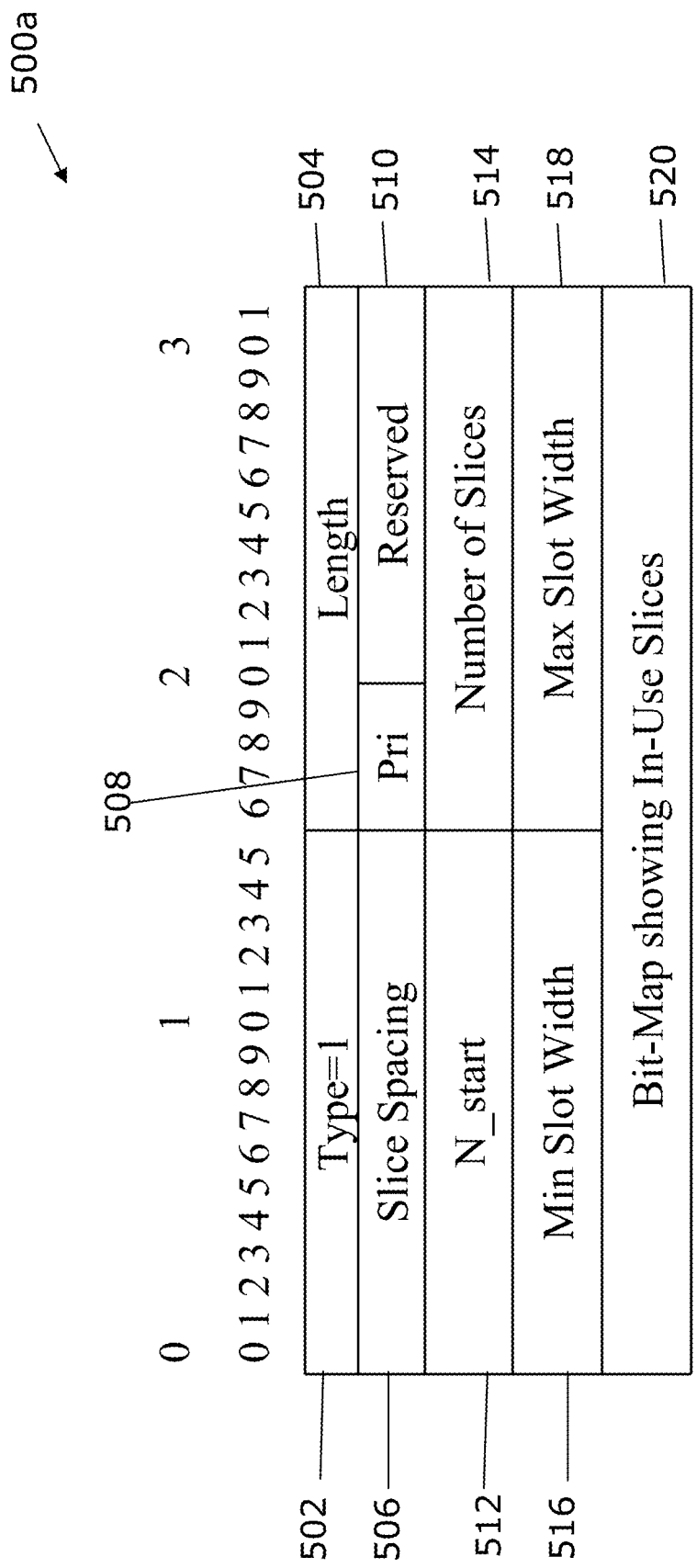
FIG. 7C is a schematic of an exemplary new Super-Channel In-Use Slices sub-TLV in Bitmap format in accordance with the present disclosure.

In one embodiment, the new Super-Channel In-Use Slices sub-TLV 500 is formatted in Bitmap format. FIG. 7C is a schematic of the new Super-Channel In-Use Slices sub-TLV 500 in Bitmap format. The Bitmap Format Super-Channel In-Use Slices sub-TLV 500*a* may include fields for Type 502, Length 504, Slice Spacing (S.S.) 506, Priority (Pri) 508, Reserved 510, N-start 512, Number of Slices 514, Minimum Slot Width 516, Maximum Slot Width 518, and Bit-Map Showing In-Use Slices 520 for a referenced Super-Channel 50 in the Optical Transport Network 20. The Type 502 field may be a three-bit field that identifies the Bitmap Format Super-Channel In-use Slices sub-TLV 500*a*. For example, a bit value of 001 may identify the Bitmap Format Super-Channel In-use Slices sub-TLV 500*a*. The Length 504 field identifies a length, in bits, bytes or octets of the Bitmap Format Super-Channel In-use Slices sub-TLV 500*a*.

The Slice Spacing 506 field may be an eight-bit field and identify one or more slice spacing that is supported, such as 12.5 GHz. The Priority 508 field may be a three-bit field. The Priority 508 may be used to identify one of eight priorities for which slice information is advertised. The ISCD 300 can include a variable number of Bitmap Format Super-Channel In-use Slices sub-TLV 500*a*. For example, the ISCD 300 may contain one of the Super-Channel In-use Slices sub-TLV 500*a* for each priority level set forth in the Max LSP Bandwidth fields 308. For example, when the ISCD 300 includes eight Max LSP Bandwidth fields 308, then eight Super-Channel In-Use Slices sub-TLV 500 may be provided with each of the eight Super-Channel In-Use Slices sub-TLV 500 corresponding to a particular priority level supported by the node 22.

The N-Start 512 field may be an eight-bit field containing an integer to specify the start of a spectrum range of the grid. In one embodiment, a center frequency formula may be used to determine the start of the spectrum range. The center frequency formula is well known in the art, for example, ITU-T Recommendation G.694.1. In general, given a slice spacing value (for example, 0.0125 THz) and a slice number "n", the slice left edge frequency can be calculated as follows:

Slice Left Edge Frequency (THz)=193.1 THz+*n**slice spacing (THz)

(Where "n" is a two's complement integer (that is, positive, negative, or zero) and "slice spacing" is 0.0125 THz conforming to ITU-T Flex Grid).

The number of slices 514 field may be a 16-bit field containing the total number of slices advertised for the link and may include available plus consumed slices for the link. The Minimum Slot Width 516 field may be a sixteen-bit field containing a positive integer value which may be used to determine the smallest frequency slot width that the node 22 carrying out advertising can allocate for an LSP. The smallest frequency slot width may be calculated by multiplying the Slice Spacing 506 value by the integer value in the Minimum Slot Width 516 field. The Maximum Slot Width 518 field may be a sixteen-bit field containing a positive integer value which may be used to determine the maximum contiguous frequency slot width that the node 22 carrying out advertising can allocate for an LSP. The Maximum Slot Width 518 field may be calculated by multiplying the Slice Spacing 506 value by the integer value in the Maximum Slot Width 518 field. The Bit-Map Showing In-Use Slices 520 field shows in-use and available slices encoded as a bit-map. Each bit may represent use of one slice of width identified by the S.S. field 506. For example, a value of zero in the bit may signify the slice is not in-use and a value of one in the bit may signify the slice is in-use.

The in-use and available (also referred to herein as "unreserved") spectral slices may be identified as at least one of a number and/or a spectral band. For example, a first unreserved spectral slice of the unreserved or available spectral slices may include a number (e.g., 5) that can be used to calculate a first frequency identifying the first unreserved spectral slice, and another number (e.g., 6) can be used to identify a second unreserved spectral slice.

In another example, the identification of the first unreserved spectral slice of the unreserved spectral slices includes numbers (n,m) where "n" may be used to calculate a central frequency of the first unreserved spectral slice, and "m" may be used to calculate the width of the first unreserved spectral slice. For example, the central frequency can be calculated using a formula $n=(f\_center\ [THz]-193.1)/0.00625$; and $m=df\_width\ [THz]/0.0125$.

Figure 7D:
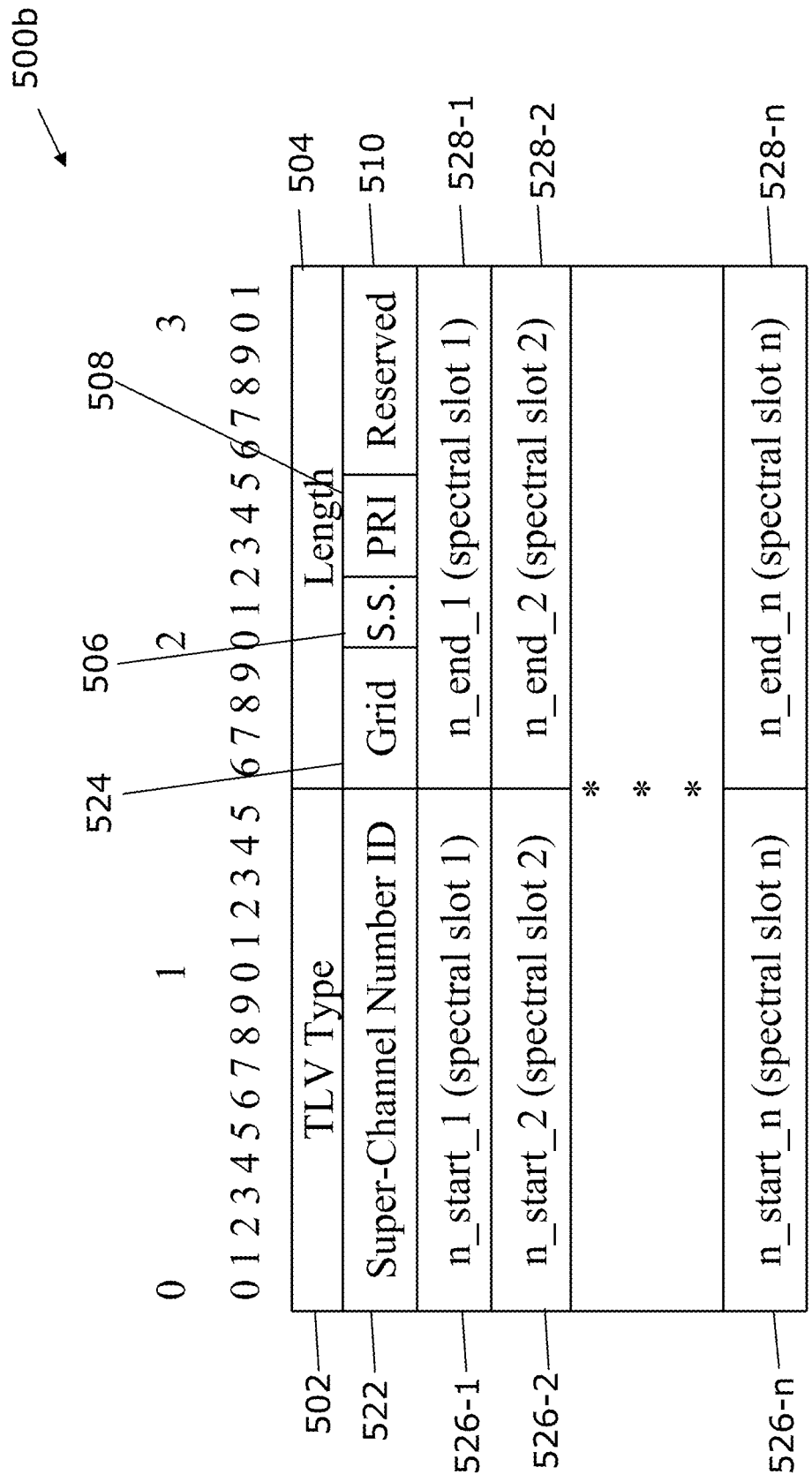
FIG. 7D is a schematic of an exemplary new Super-Channel In-Use Slices sub-TLV in list/range format in accordance with the present disclosure.

In another embodiment, the new Super-Channel In-Use Slices sub-TLV 500 may be formatted in list/range format. FIG. 7D is a schematic of a List/Range Format Super-Channel In-Use Slices sub-TLV 500*b*. The List/Range Format Super-Channel In-Use Slices sub-TLV 500*b* may include fields for a TLV Type 502, Length 504, Super-Channel ID 522, Grid 524, Slice Spacing (S.S.) 506, Priority (Pri) 508, Reserved 510, and In-Use Slices spectral slot start information 526 and end information 528 (n_start_1, n_end_1, n_start_2, n_end_2, ... n_strart_n, n_end_n), for a referenced Super-Channel 50 in the Optical Transport Network 20.

The Super-Channel ID 522 may be used to identify which Super-Channel's 50 information is contained in the Super-Channel In-Use Slices sub-TLV 500. The Super-Channel ID 522 is indicative of a logical identifier for a contiguous spectrum Super-Channel 50 or a split-spectrum Super-Channel 50.

The Slice Spacing (S.S.) 506 may be contained in an eight-bit field. The Priority 508 may be contained in a three-bit field. The Priority 508 may be used to identify one of eight priorities for which slice information is advertised, as described above.

The spectral slot start information 526 and end information 528 may be in eight-bit fields and may use integers to specify the start of the grid and the end of the list/range. A center frequency formula may be used to determine the start and end of spectrum, as previously discussed.

The information in the Super-Channel TLV 400 data structure and sub-structures, including the optical signal attribute and in-use slice information, allows each node 22 across the Optical Transport Network 20 to apply added Constrained-Shortest-Path-First (CSPF) constraints and assign new Super-Channels 50 spectrum by considering not only the availability of the required number of slices but also the optical signal compatibility of the existing and the new Super-Channels 50 along the desired path through use of the in-use slice information and optical signal attributes information about the Super-Channels 50.

In use, the nodes along paths traversed by the Super-Channels 50 advertise in the OSPF-TE link LSA the current status of the in-use and available slices and optical signal attributes for each Super-Channel 50 using the Super-Channel TLV 400 data structure and sub-structures.

The nodes 22 in the Optical Transport Network 20 that are capable of Super Channel Switching advertise slices of certain width available based on the frequency spectrum supported by the node 22 (e.g. C band, extended C-band). For example, node(s) 22 supporting extended C-band will advertise 384 slices in the Number of Slices 514 field. The BandWidth advertisement may involve the ISCD 300 containing slice information in bit-map format (Type=1 BW-sub-TLV) where each bit corresponds to a single slice of width as identified by the Slice Spacing 506 field, or Slice information in list/range format (Type=2 BW-sub-TLV) where each 32-bit entry represents an individual spectral slice, list, or spectral range. The nodes 22 in the Optical Transport Network can reserve any number of spectral slices between the minimum slot width and the maximum slot width discussed above to set up the label switched path. For example, a first label switched path on the TE link 30 may include four spectral slices, and a second label switched path on the TE link 30 may include eight spectral slices. It should be noted that a set of spectral slices reserved when setting up a Super Channel may be contiguous or non-contiguous. When the set of spectral slices are non-contiguous, a spectral slice which is not reserved for the Super Channel is positioned between spectral slices that are reserved for the Super Channel.

The slice position/numbering in Type=1 sub-TLV is identified based on the N-start 512 field. The N-start 512 field may be derived based on the ITU center frequency formula. The node 22 which is advertising the available slices preferably also sets the Number of Slices 514 field.

The Minimum & Maximum Slot Width 516 and 518 fields may be included to allow for any restrictions on the link for carrying super channel LSPs.

The BW advertisement may be priority based, as discussed above, and may allow up to 8 priority levels. The node 22 that is capable of supporting one or more priorities preferably sets the priority field and includes the Super-Channel In-Use Slices sub-TLV 500 for each supported priority level.

Through OSPF-TE LSAs flooding other nodes 22 in the routing domain, the nodes 22 learn about the current status on each TE link 30. The presence of this information across the network topology enables source nodes 24 in the Optical Transport Network 20 to apply added CSPF constraints. For example, the added CSPF constraints may be used to group Super-Channels 50 with different modulation formats in different bands (slice ranges). Additionally, or alternately, the added CSPF constraints may be used to group Super-Channels 50 with the same bit-rate in a band (slice range) while separating the group of Super-Channels 50 with a guard band from Super-Channels with a different bit-rate. These and other methods utilizing the Super-Channel TLV 400 data structures and sub-structures allow efficient network utilization by avoiding excessive worst-case OSNR penalty while preserving desired quality of transmission of the existing Super-Channels 50.

As an example, when no service is present on the TE link 30, the Super-Channel In-Use Slices sub-TLV 500a may include: N-start 512 field=−142 for extended C-band; Number of Slices 514 field=384 denoting the total number of slices available on the link (based on Slice spacing=12.5 GHz); Minimum Slot Width 516 field shows minimum consumption of 4 Slices per LSP (=50 GHz); Maximum Slot Width 518 field shows up to 400 GHz BW allowed per LSP (32×12.5 GHz); the Bit Map Showing In-Use Slices may include 48 bytes showing that all 384 slices are available.

CONCLUSION

The mechanisms proposed in this disclosure circumvent the problems described above. The problem of underutilization of an optical network due to ineffective advertisement of unreserved bandwidth within the optical network is addressed by a link state advertisement message (LSA) conforming to a Generalized Multiprotocol Label Switching (GMPLS) routing protocol being generated and transmitted. The LSA is associated with a TE Link between a transmit node and a receive node in a network. The transmit node supplies a plurality of optical signals, each of which has a plurality of frequencies, the frequencies being allocated among a plurality of spectral portions such that the plurality of spectral portions are grouped into a plurality of frequency slots. The LSA may include information indicative of a number of spectral portions, e.g., spectral slices, which correspond to frequencies of selected ones of the plurality of optical signals, said selected ones of the plurality of optical signals being available to carry data from the transmit node to the receive node. This can be accomplished by including slice spacing information and an identification of the unreserved spectral portions, e.g., slices, in a Bandwidth sub TLV in a Link-State Advertising message passed between Control Planes of nodes.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

In addition, information regarding the Optical Transport Networks and/or super-channels can be stored and processed in a distributed fashion, or in a centralized fashion. For example, information can be stored in a distributed fashion (distributed storage having multiple memory/storage devices) and processed in a distributed manner preferably by using a hop-to-hop processing. In another implementation, the distributed storage may be replaced by a centralized memory that stores the spectral slice and frequency slot information for all, or a subset, of the nodes. In this situation, the nodes may include communication paths to obtain the information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are referred to herein to teach various aspects of the present disclosure:

[RFC 2328], "OSPF Version 2," Moy, J., The Internet Society, April 1998.

[RFC 3630] "Traffic Engineering (TE) Extensions to OSPF Version 2", Katz, Kompella, and Yeung, The Internet Society, September 2003.

[RFC 3471] Berger, L., "Generalized Multi-Protocol Label Switching (GMPLS) Signaling Functional Description", The Internet Society, January 2003.

[RFC 3473] "Generalized Multi-Protocol Label Switching (GMPLS) Signaling Resource ReserVation Protocol-Traffic Engineering (RSVP-TE) Extensions", Berger (Ed.), The Internet Society, January 2003.

[RFC 3945] "Generalized Multi-Protocol Label Switching (GMPLS) Architecture", Mannie, E., The Internet Society, October 2004.

[RFC 4202] "Routing Extensions in Support of Generalized Multi-Protocol Label Switching (GMPLS)," Kompella, K. and Y. Rekhter, Ed., The Internet Society, October 2005.

[RFC 4203] "OSPF Extensions in Support of Generalized Multi-Protocol Label Switching (GMPLS)", Kompella, K. and Y. Rekhter, The Internet Society, October 2005.

[RFC 4204] "Link Management Protocol (LMP)", Lang, J., Ed., The Internet Society, October 2005.

[RFC 4328] "Generalized Multi-Protocol Label Switching (GMPLS) Signaling Extensions for G.709 Optical Transport Networks Control", Papadimitriou, D., The Internet Society, January 2006.

[RFC 4775] "Procedures for Protocol Extensions and Variations," Bradner et al., The Internet Society, December 2006.

[RFC 5340] "OSPF for IPv6," Coltun et al., The Internet Society, July 2008.

[G.694.1] ITU-T, "Spectral grids for WDM applications: DWDM frequency grid", June 2002.

[G.709-v3] ITU-T, "Interfaces for the Optical Transport Network (OTN)", December 2009.

[G.805] ITU-T, "Generic functional architecture of transport networks", March 2000.

[G.872] ITU-T, "Architecture of Optical Transport Networks", November 2001.

What is claimed is:

1. A method comprising the steps of:
generating, by circuitry of a transmit node, a link state advertising message conforming to a Generalized Multiprotocol Label Switching (GMPLS) routing protocol, the link state advertising message being associated with a TE Link between a transmit node and a receive node in a network, the transmit node supplying a plurality of optical signals, each of which having a plurality of frequencies, the frequencies being allocated among a plurality of spectral portions such that the plurality of spectral portions are grouped into a plurality of frequency slots, the link state advertising message including information indicative of a number of spectral portions, which correspond to frequencies of selected ones of the plurality of optical signals, said selected ones of the plurality of optical signals being available to carry data from the transmit node to the receive node; and
transmitting the link state advertising message from the transmit node to the receive node; and
establishing a label switched path in accordance with the number of the plurality of spectral portions,
wherein the link state advertising message further comprises Minimum and Maximum Slot Width fields including information indicative of a range of minimum and maximum number of spectral portions.

2. The method of claim 1, wherein the label switched path is a Super-Channel including one or more of the number of the plurality of spectral portions that are collectively routed together through the optical network.

3. The method of claim 1, wherein the receive node stores the information indicative of a number of spectral portions in a link state database used for computing routes in the network for setting up the label switched path.

4. The method of claim 3, wherein the link state advertising message is formatted in a type-length-value (TLV) format data structure.

5. The method of claim 4, wherein the information indicative of a number of spectral portions is formatted in a sub-TLV format data structure.

6. The method of claim 1, wherein the information indicative of a number of spectral portions identifies available spectral portions, and wherein the link state advertising message further comprises an identification of in-use spectral portions, and wherein the identification of the in-use and the unreserved spectral portions is formatted as a bit-map.

7. The method of claim 1, wherein the link state advertising message further comprises a N-start field including information indicative of a start of a spectrum range encompassing the frequencies of the selected ones of the plurality of optical signals.

8. The method of claim 1, wherein link state advertising message further comprises information defining one or more frequency slots within a spectrum range encompassing the frequencies of the selected ones of the plurality of optical signals.

9. The method of claim 1, wherein the information indicative of a number of spectral portions identifies a first frequency corresponding to a first unreserved spectral portion, and second frequency corresponding to a second unreserved spectral portion, the first frequency being different from the second frequency.

10. The method of claim 1, wherein the label switched path is a Super-Channel.

11. A method comprising the steps of:
generating, by circuitry of a transmit node, a link state advertising message conforming to a Generalized Multiprotocol Label Switching (GMPLS) routing protocol, the link state advertising message being associated with a TE Link between a transmit node and a receive node in a network, the transmit node supplying a plurality of optical signals, each of which having a plurality of frequencies, the frequencies being allocated among a plurality of spectral portions such that the plurality of spectral portions are grouped into a plurality of frequency slots, the link state advertising message including information indicative of a number of spectral portions, which correspond to frequencies of selected ones of the plurality of optical signals, said selected ones of the plurality of optical signals being available to carry data from the transmit node to the receive node; and
transmitting the link state advertising message from the transmit node to the receive node; and
establishing a label switched path in accordance with the number of the plurality of spectral portions, wherein the information indicative of a number of spectral portions includes an identification of a central frequency and width of a first unreserved spectral portion.

12. A method comprising the steps of:
retrieving a link state advertising message from a network interface, by a component of a first node, the link state advertising message including information for a TE Link between the first node and a second node, the TE link having a spectrum range divided by spectral portions in which frequency slots are defined that have different amounts of spectral portions to provide the frequency slots with different widths, the link state advertising message including an identification of unreserved spectral portions, at least two of the unreserved spectral portions being first spectral portions separated by a second spectral portion; and reserving, by a component of the first node, the first spectral portions for a super channel on the TE Link without reserving the second spectral portion for the super channel, wherein the link state advertising message further includes an identification of a central frequency and width of one of the unreserved spectral portions.

* * * * *